US010330141B2

(12) United States Patent
Kurokawa

(10) Patent No.: US 10,330,141 B2
(45) Date of Patent: Jun. 25, 2019

(54) EXTENSIBLE ROTATION TRANSMISSION SHAFT

(71) Applicant: NSK LTD., Shinagawa-ku, Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 324 days.

(21) Appl. No.: 15/122,219

(22) PCT Filed: Jul. 2, 2015

(86) PCT No.: PCT/JP2015/069212
§ 371 (c)(1),
(2) Date: Aug. 29, 2016

(87) PCT Pub. No.: WO2016/002912
PCT Pub. Date: Jan. 7, 2016

(65) Prior Publication Data
US 2016/0369835 A1    Dec. 22, 2016

(30) Foreign Application Priority Data

Jul. 3, 2014    (JP) .................................. 2014-137845

(51) Int. Cl.
*F16C 3/035* (2006.01)
*F16D 3/06* (2006.01)
*B62D 1/185* (2006.01)

(52) U.S. Cl.
CPC .............. *F16C 3/035* (2013.01); *B62D 1/185* (2013.01); *F16D 3/065* (2013.01)

(58) Field of Classification Search
CPC ........ B62D 1/185; F16C 3/035; F16C 29/002; F16C 29/04; F16C 29/123; F16C 33/405; F16C 33/605; F16C 2326/24; F16D 3/065
(Continued)

(56) References Cited

U.S. PATENT DOCUMENTS 7,416,199 B2 *  8/2008  Yamada ................. B62D 1/185
                                                    464/162
7,416,216 B2 *  8/2008  Shoda .................... B62D 1/185
                                                    464/167
(Continued)

FOREIGN PATENT DOCUMENTS

CN    1732103 A    2/2006
CN    1745013 A    3/2006
(Continued)

OTHER PUBLICATIONS

Specification Translation of DE 3513340. Boll, et al. Driving connection between a shaft and a hub. Oct. 23, 1986.*
(Continued)

*Primary Examiner* — Josh Skroupa
(74) *Attorney, Agent, or Firm* — Sughrue Mion, PLLC

(57) ABSTRACT

The rolling surface of each ball and a radially outside surface of the inside guide plate are in contact with each other only at two circumferentially set-apart inside contact parts. The rolling surface of each ball and a radially inside surface of the outside guide plate are in contact with each other only at two circumferentially set-apart outside contact parts. At a state after the extensible rotation transmission shaft is assembled, at least the inner surface of the inner-side concave groove is elastically deformed more radially inwards than a state before the assembling, thereby preloading the respective balls.

12 Claims, 16 Drawing Sheets

(58) Field of Classification Search
USPC .................. 464/167; 384/54; 74/493
See application file for complete search history.

(56) References Cited

U.S. PATENT DOCUMENTS

| | | |
|---|---|---|
| 2005/0257639 A1 | 11/2005 | Yamada |
| 2006/0012161 A1 | 1/2006 | Yamada |
| 2006/0156855 A1* | 7/2006 | Yukawa ............... B62D 1/185 74/493 |
| 2006/0162989 A1 | 7/2006 | Yamada |
| 2006/0181069 A1 | 8/2006 | Yamada |
| 2010/0210370 A1 | 8/2010 | Kwon et al. |

FOREIGN PATENT DOCUMENTS

| | | |
|---|---|---|
| DE | 3513340 C2 | 11/1988 |
| DE | 37 30 393 A1 | 3/1989 |
| DE | 198 17 290 A1 | 10/1999 |
| JP | 2004-106599 A | 4/2004 |
| JP | 2005114068 A * | 4/2005 ............ F16C 29/123 |
| JP | 2005-231625 A | 9/2005 |
| JP | 2006-224767 A | 8/2006 |
| JP | 2007-16951 A | 1/2007 |
| JP | 2008-6903 A | 1/2008 |
| JP | 2008-164150 A | 7/2008 |
| JP | 2009-107428 A | 5/2009 |
| JP | 2009-191978 A | 8/2009 |
| JP | 2011-500421 A | 1/2011 |
| JP | 5077360 B2 | 11/2012 |

OTHER PUBLICATIONS

Specification Translation of DE 3730393. Burmeister, et al. Torque-transmitting connection for shaft components which can be pushed axially one into the other, in particular of the steering shaft of motor vehicles. Mar. 23, 1989.*
Communication dated Oct. 8, 2018, issued by the State Intellectual Property Office of P.R. China in counterpart Chinese Application No. 201580011501.2.
Communication dated Dec. 20, 2016 issued by the European Patent Office in counterpart European Patent Application No. 15814678.7.
Communication dated Feb. 8, 2018, from the State Intellectual Property Office of People's Republic of China in counterpart Application No. 201580011501.2.
International Search Report dated Oct. 6, 2015 in International Application No. PCT/JP2015/069212 (PCT/ISA/210).
Written Opinion dated Oct. 6, 2015 in International Application No. PCT/JP2015/069212 (PCT/ISA/237).

* cited by examiner

EXTENSIBLE ROTATION TRANSMISSION SHAFT

FIELD

The present invention relates to improvements on an extensible rotation transmission shaft configured to transmit a rotational force (torque) and to be axially extendible. The extensible rotation transmission shaft of the present invention is applied to a steering shaft, an intermediate shaft or the like configuring a steering device of an automobile, for example.

RELATED ART

A steering device of an automobile is configured to transmit movement of a steering wheel 1 to a steering gear unit 2, as shown in FIG. 15, for example. The movement of the steering wheel 1 is transmitted to an input shaft 6 of the steering gear unit 2 via a steering shaft 3, a universal joint 4a, an intermediate shaft 5 and a universal joint 4b. Thereby, the steering gear unit 2 pushes or pulls a pair of left and right tie-rods 7, 7, thereby providing a desired steering angle for the steering wheel. In the example of FIG. 15, an electric power steering device configured to apply an auxiliary force, which corresponds to a force applied to the steering wheel 1 by a driver, to the steering shaft 3 by an electric motor 8 is incorporated.

Also, as the steering shaft 3 and the intermediate shaft 5 configuring the steering device as described above, a shaft disclosed in Patent Documents 1 and 2 has been known. In a structure disclosed in Patent Documents 1 and 2, a plurality of balls is disposed between an inner shaft and an outer shaft, so that the rotational force can be transmitted between both the shafts via the respective balls and both the shafts can be relatively displaced axially. FIGS. 16 and 17 depict an example of an extensible rotation transmission shaft configured to transmit the rotational force and to be relatively displaced axially (expanded and contracted). An extensible rotary shaft shown in FIGS. 16 and 17 has an inner shaft 9, an outer shaft 10, and a plurality of balls 11, 11. Inner-side concave grooves 12, 12 recessed radially inwards are axially formed at two circumferential locations of an outer periphery surface of the inner shaft 9. Also, inner-side preliminary concave grooves 13, 13, which have the same shape as each of the inner-side concave grooves 12, 12 but the respective balls 11, 11 are not disposed therein at an assembled state, are provided at positions at which the inner-side preliminary concave grooves are shifted in circumferential phase 90° with respect to each of the inner-side concave grooves 12, 12.

Also, the outer shaft 10 has a hollow cylinder shape into which the inner shaft 9 can be inserted. Outer-side concave grooves 14, 14 recessed radially outwards are axially formed at two circumferential locations of an inner periphery surface of the outer shaft 10 at which the outer-side concave grooves correspond to the inner-side concave grooves 12, 12. Also, outer-side preliminary concave grooves 15, 15, which have the same shape as each of the outer-side concave grooves 14, 14 but the respective balls 11, 11 are not disposed therein at the assembled state, are provided at positions at which the outer-side preliminary concave grooves are shifted in circumferential phase 90° with respect to each of the outer-side concave grooves 14, 14. Also, the respective balls 11, 11 are disposed between the respective inner-side and outer-side concave grooves 12, 14. As shown in FIG. 16, the respective balls 11, 11 are disposed with being aligned in series axially between the respective inner-side and outer-side concave grooves 12, 14. The rotation can be transmitted between both the shafts 9, 10 via the respective balls 11, 11, and both the shafts 9, 10 are configured to axially slide each other.

In order to suppress rattling which occurs in the extensible rotation transmission shaft as described above, to prevent an abnormal noise from being generated and to secure a stable expansion and contraction operation, a structure where a guide plate such as a plate spring having a preload applying function is incorporated is considered, as disclosed in Patent Document 3. According to the conventional structure of Patent Document 3, the guide plate is provided between an outer surface of the inner-side concave groove and a rolling surface of each ball, each ball is pressed to an inner surface of the outer-side concave groove, and each ball is preloaded, so that the rattling of the extensible rotation transmission shaft is suppressed. However, when the structure where the guide plate is provided between the outer surface of the inner-side concave groove and the rolling surface of each ball is adopted, following problems may be caused depending on structures of the respective parts.

First, in case of a structure where each guide plate is highly bending-deformed after the extensible rotation transmission shaft is assembled, each guide plate may be damaged by fatigue caused due to longtime using.

Second, even in a structure where each guide plate is highly bending-deformed upon transmission of the rotational force, each guide plate may be damaged by the fatigue caused due to the longtime using.

Third, when the inner shaft and the outer shaft configuring the extensible rotation transmission shaft are relatively displaced axially and thus the respective balls roll on surfaces (rolling surfaces) of the respective guide plates, compressive load is repeatedly applied to the surface of each guide plate from the rolling surface of each ball. For this reason, when a backside (an opposite surface to the rolling surface) of each guide plate is not supported by the outer surface of the inner-side concave groove, tensile deformation may be repeatedly applied, thereby damaging the guide plate.

In the meantime, the second and third problems are like to occur simultaneously and frequently when the extensible rotation transmission shaft is incorporated into a vehicle, as a steering shaft or an intermediate shaft.

Fourth, when each guide plate is highly bending-deformed due to the first and second reasons, each guide plate and the outer periphery surface of the inner shaft (or the inner periphery surface of the outer shaft) may be contacted to each other and the contact part may be excessively worn.

CITATION LIST

Patent Documents

Patent Document 1: Japanese Patent Application Publication No. 2008-6903A
Patent Document 2: Japanese Patent Application Publication No. 2007-16951A
Patent Document 3: Japanese Patent Application Publication No. 2011-500421A

SUMMARY

Problems to be Solved

The present invention has been made in view of the above situations, and an object of the invention is to implement an extensible rotation transmission shaft having a structure capable of suppressing rattling of the extensible rotation transmission shaft while preventing damage to a guide plate and wear of each part.

Means for Solving the Problems

An extensible rotation transmission shaft of the present invention has an inner shaft, an outer shaft, a plurality of balls, an inside guide plate and an outside guide plate where the inner shaft and the outer shaft are combined so that a rotational force can be transmitted therebetween and axial relative displacement can be made.

The inner shaft is provided at at least one circumferential location of an outer periphery surface thereof with an inner-side concave groove recessed radially inwards and extended axially.

The outer shaft has a hollow cylinder shape into which the inner shaft can be inserted and is provided with an outer-side concave groove recessed radially outwards and extended axially at at least one circumferential location of an inner periphery surface thereof, at which the outer-side concave groove corresponds to the inner-side concave groove.

The respective balls are arranged in series axially between the inner-side concave groove and the outer-side concave groove.

The inside guide plate is sandwiched between the rolling surface of each ball and an outer surface of the inner-side concave groove.

The outside guide plate is sandwiched between the rolling surface of each ball and an inner surface of the outer-side concave groove.

Particularly, according to the extensible rotation transmission shaft of the present invention, at a state where a rotational force is not transmitted between the inner shaft and the outer shaft after the extensible rotation transmission shaft is assembled (the inner shaft and the outer shaft are combined), the rolling surface of each ball and a radially outside surface of the inside guide plate are in contact with each other only at two circumferentially set-apart inside contact parts, and portions (portions located on a backside of the inside contact parts and closest to the inside contact parts) of the radially inside surface of the inside guide plate, which correspond to the respective inside contact parts, are supported by the outer surface of the inner-side concave groove.

At the state where the rotational force is not transmitted between the inner shaft and the outer shaft after the extensible rotation transmission shaft is assembled, the rolling surface of each ball and a radially inside surface of the outside guide plate are in contact with each other only at two circumferentially set-apart outside contact parts, and portions (portions located on a backside of the outside contact parts and closest to the outside contact parts) of the radially outside surface of the outside guide plate, which correspond to the respective outside contact parts, are supported by the inner surface of the outer-side concave groove.

Further, at the state after the extensible rotation transmission shaft is assembled, at least the inner surface of the outer-side concave groove is elastically deformed more radially outwards than a state before the assembling (the outer surface of the inner-side concave groove is elastically deformed radially inwards, as required), thereby preloading the respective balls.

When implementing the extensible rotation transmission shaft of the present invention, the respective balls are preloaded, without elastic forces of the inside guide plate and the outside guide plate.

When implementing the extensible rotation transmission shaft of the present invention, a first inside non-contact part of which a radially outside surface is not contacted to the rolling surfaces of the respective balls and a radially inside surface is not contacted to the outer surface of the inner-side concave groove is provided between the two inside contact parts of the inside guide plate.

When implementing the extensible rotation transmission shaft of the present invention, a pair of second inside non-contact parts of which radially outside surfaces are not contacted to the rolling surfaces of the respective balls and radially inside surfaces are not contacted to the outer surface of the inner-side concave groove is provided at both circumferential portions of the two inside contact parts of the inside guide plate.

When implementing the extensible rotation transmission shaft of the present invention, the inside guide plate is formed to have a cylindrical shape or a partially cylindrical shape, and is fitted to the outer periphery surface of the inner shaft with an interference.

In the meantime, the partially cylindrical shape includes a notched cylindrical shape where a circumferential length of a discontinuous part provided at one circumferential location is short, a semi-cylindrical shape or a ¼ cylindrical shape where the circumferential length of the discontinuous part is long, and the like.

When implementing the extensible rotation transmission shaft of the present invention, a first outside non-contact part of which a radially inside surface is not contacted to the rolling surfaces of the respective balls and a radially outside surface is not contacted to the inner surface of the outer-side concave groove is provided between the two outside contact parts of the outside guide plate.

When implementing the extensible rotation transmission shaft of the present invention, a pair of second outside non-contact parts of which radially inside surfaces are not contacted to the rolling surfaces of the respective balls and radially outside surfaces are not contacted to the inner surface of the outer-side concave groove is provided at both circumferential portions of the two outside contact parts of the outside guide plate.

When implementing the extensible rotation transmission shaft of the present invention, the outside guide plate is formed to have a cylindrical shape or a partially cylindrical shape, and is fitted to the inner periphery surface of the outer shaft with an interference.

When implementing the extensible rotation transmission shaft of the present invention, at least one guide plate of the inside guide plate and the outside guide plate is provided in plural (for example, two or three), and each of the guide plates is formed to have a partially cylindrical shape.

When implementing the extensible rotation transmission shaft of the present invention, the inner-side concave groove is provided in two at positions on the outer periphery surface of the inner shaft at which the inner-side concave grooves are shifted in circumferential phase 180° relative to each other, the outer-side concave groove is provided in two at positions on the inner periphery surface of the outer shaft at which the outer-side concave grooves correspond to the two inner-side concave grooves, the plurality of balls is arranged in two lines between the two inner-side concave grooves and the two outer-side concave grooves, and the outer periphery surface of the inner shaft is provided with two inner-side preliminary concave grooves recessed radially inwards and extended axially at positions at which the two inner-side preliminary concave grooves are shifted in circumferential phase 90° with respect to the two inner-side concave grooves.

When implementing the extensible rotation transmission shaft of the present invention, the inner-side concave groove is provided in two at positions on the outer periphery surface of the inner shaft at which the inner-side concave grooves are shifted in circumferential phase 180° relative to each other, the outer-side concave groove is provided in two at positions on the inner periphery surface of the outer shaft at which the outer-side concave grooves correspond to the two inner-side concave grooves, the plurality of balls is arranged in two lines between the two inner-side concave grooves and the two outer-side concave grooves, and the inner shaft has a hollow cylinder shape.

When implementing the extensible rotation transmission shaft of the present invention, the inner-side concave groove is provided in two at positions on the outer periphery surface of the inner shaft at which the inner-side concave grooves are shifted in circumferential phase 180° relative to each other, the outer-side concave groove is provided in two at positions on the inner periphery surface of the outer shaft at which the outer-side concave grooves correspond to the two inner-side concave grooves, the plurality of balls is arranged in two lines between the two inner-side concave grooves and the two outer-side concave grooves, and the inner periphery surface of the outer shaft is provided with two outer-side preliminary concave grooves recessed radially outwards and extended axially at positions at which the two outer-side preliminary concave grooves are shifted in circumferential phase 90° with respect to the two outer-side concave grooves.

Effects of the Invention

According to the extensible rotation transmission shaft of the present invention configured as described above, it is possible to implement the structure capable of suppressing the rattling while preventing damage to the guide plates and wear of the respective parts.

That is, according to the present invention, the respective balls of the extensible rotation transmission shaft are pre-loaded using the inner surface of the outer-side concave groove configured to elastically deform radially outwards or the outer surface of the inner-side concave groove configured to elastically deform radially inwards at the assembled state, thereby preventing the rattling of the extensible rotation transmission shaft. For this reason, the structure capable of suppressing the rattling of the extensible rotation transmission shaft can be implemented without causing the high bending deformation to the inside guide plate or the outside guide plate at the state after the extensible rotation transmission shaft is assembled.

In the meantime, when preloading the respective balls, it is possible to further suppress the bending deformation of the inside guide plate or the outside guide plate if the preload is not applied depending on the elastic force of the inside guide plate or the outside guide plate.

Also, the portions located on the backside of the inside contact parts of the inside guide plate, which are configured to contact the rolling surfaces of the respective balls, may be supported by the outer surface of the inner-side concave groove, and the portions located on the backside of the outside contact parts of the outside guide plate, which are configured to contact the rolling surfaces of the respective balls, may be supported by the inner surface of the outer-side concave groove. In this case, when transmitting the high rotational force between the inner shaft and the outer shaft, it is possible to prevent the high bending deformation from being generated in both the inside and outside guide plates. Also, when the inner shaft and the outer shaft are relatively displaced axially, it is possible to prevent the high tensile deformation from being generated in both the inside and outside guide plates, which the tensile deformation is caused due to the rolling of the respective balls on both the inside and outside guide plates.

Further, according to the present invention, as described above, at the assembled state and when transmitting the rotational force, since it is possible to prevent the high bending deformation from being generated in both the inside and outside guide plates, even when both the inside and outside guide plates and the outer periphery surface of the inner shaft or the inner periphery surface of the outer shaft are contacted, it is possible to prevent the wear from being excessively caused at the corresponding contact parts.

As a result, according to the extensible rotation transmission shaft of the present invention, it is possible to implement the structure capable of suppressing the rattling while preventing damage to the inside and outside guide plates and wear of the respective parts.

Also, according to the present invention defined in claims 4 and 5, since it is possible to reduce an area of a part at which the radially inside surface of the inside guide plate and the outer surface of the inner-side concave groove are contacted to each other, it is possible to prevent the wear of the respective parts more effectively.

DETAILED DESCRIPTION

[First Example of Embodiment]

Figure 15:
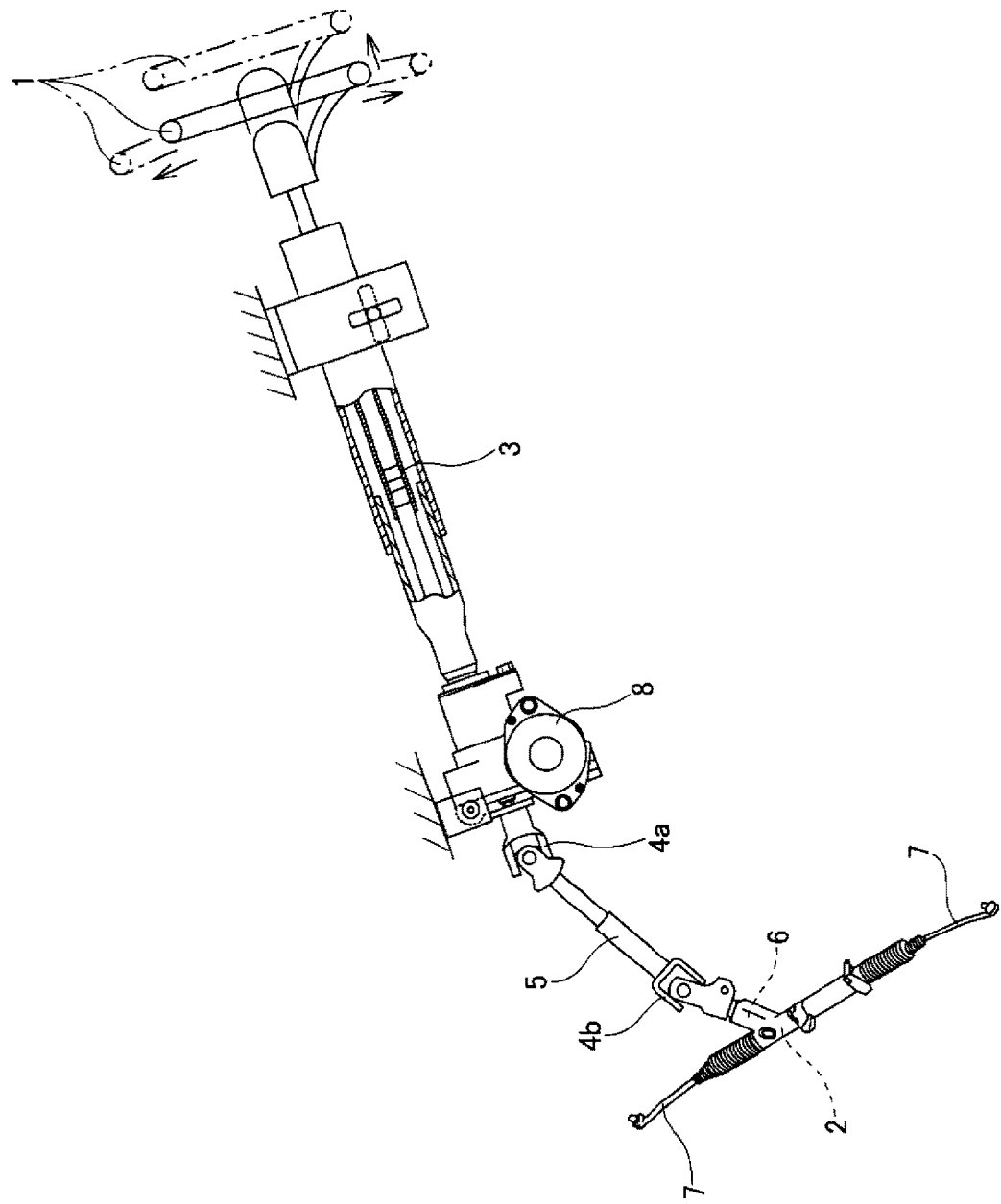
FIG. 15 is a partially longitudinal side view, depicting an example of a steering device for an automobile.
Figure 16:
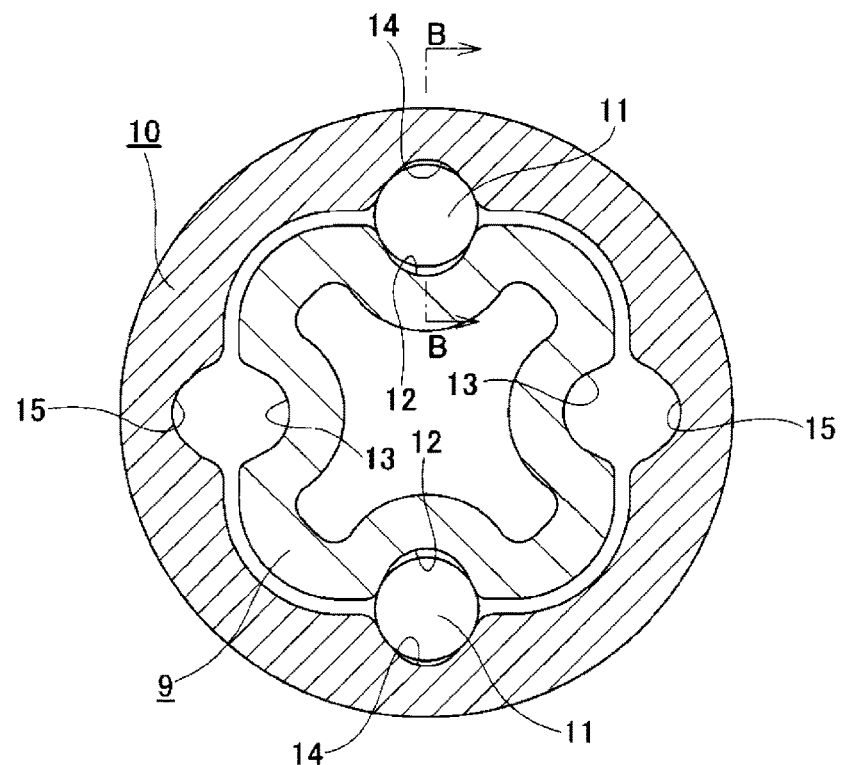
FIG. 16 is a sectional view depicting an example of an extensible rotation transmission shaft of the related art.
Figure 17:
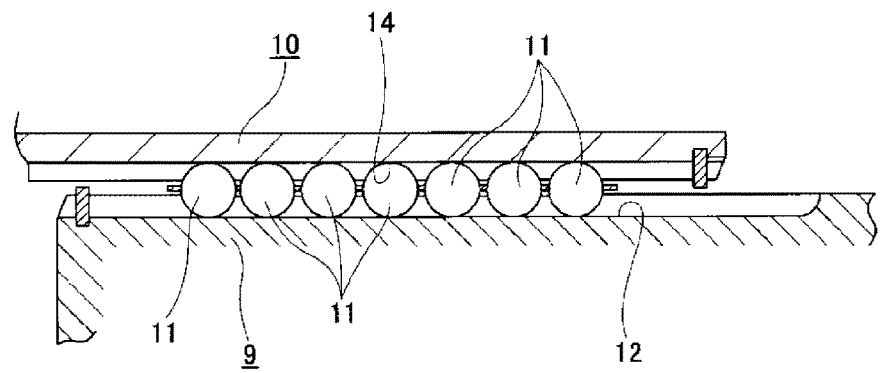
FIG. 17 is a B-B sectional view of FIG. 16.

A first example of an embodiment of the present invention is described with reference to FIGS. 1 to 5. In this example, an extensible rotation transmission shaft 16 is used as a variety of shafts required to have both functions of torque (rotational force) transmission and axial expansion and contraction. In this example, the extensible rotation transmission shaft 16 is applied for the intermediate shaft 5 or the steering shaft 3 shown in FIG. 15. Therefore, the extensible rotation transmission shaft 16 of this example has an inner shaft 9a, an outer shaft 10a, and a plurality of balls 11, 11, like the structure shown in FIGS. 16 and 17, and further has an inside guide plate 17 and an outside guide plate 18.

The inner shaft 9a has a substantial cross cylinder shape (hollow shape) as a whole. Inner-side concave grooves 12a, 12a recessed radially inwards and extended axially are provided at two circumferentially equidistant locations (diametrically opposite positions) of an outer periphery surface of the inner shaft 9a. That is, the inner-side concave grooves 12a, 12a provided at the two locations are shifted in circumferential phase 180° relative to each other. Also, the outer periphery surface of the inner shaft 9a is provided with inner-side preliminary concave grooves 13a, 13a at positions at which the inner-side preliminary concave grooves are shifted in circumferential phase 90° with respect to the inner-side concave grooves 12a, 12a, respectively. The respective inner-side preliminary concave grooves 13a, 13a have the same shape as the respective inner-side concave grooves 12a, 12a. However, at a state where the extensible rotation transmission shaft 16 is assembled, the respective balls 11, 11 are not disposed in the inner-side concave grooves 12a, 12a. In this example, the inner-side concave grooves 12a, 12a and the inner-side preliminary concave grooves 13a, 13a are formed by plastically deforming an outer periphery surface of a cylindrical material towards a radially inner direction. For this reason, portions of an inner periphery surface of the inner shaft 9a that correspond to the respective inner-side concave grooves 12a, 12a and the respective inner-side preliminary concave grooves 13a, 13a protrude radially inwards.

Also, in this example, a cross-sectional shape of each inner-side concave groove 12a (and each inner-side preliminary concave groove 13a) is formed as a complex arc consisting of a plurality of arcs having different radii of curvature and made to smoothly continue. More specifically, the cross-sectional shape is a substantial Gothic arch shape where a pair of large diameter arc-shaped parts 19, 19 provided at both sides in a width direction (circumferential direction) of each inner-side concave groove 12a is made to smoothly continue at a central portion in the width direction by a small diameter arc-shaped part 20 of which a radius of curvature is smaller than both the large diameter arc-shaped parts 19, 19. Also, the radius of curvature R12 of the large diameter arc-shaped part 19 is made to be greater than a radius of curvature R11 of a rolling surface of each ball 11 (R12>R11).

The outer shaft 10a has a hollow cylinder shape into which the inner shaft 9a can be inserted. An outer periphery surface of the outer shaft 10a has a single cylindrical surface shape. An inner periphery surface of the outer shaft 10a is formed with a plurality of concave grooves recessed radially outwards. That is, outer-side concave grooves 14a, 14a recessed radially outwards and extended axially are axially formed at two circumferential positions of the inner periphery surface of the outer shaft 10a, at which the outer-side concave grooves 14a, 14a correspond to the inner-side concave groove 12a, 12a. Also, the inner periphery surface of the outer shaft 10a is provided with outer-side preliminary concaves grooves 15a, 15a at positions at which the outer-side preliminary concaves grooves 15a, 15a are shifted in circumferential phases 45° and 90° with respect to the respective outer-side concave grooves 14a, 14a. The respective outer-side preliminary concave grooves 15a, 15a have the same shape as the respective outer-side concave grooves 14a, 14a. However, at a state where the extensible rotation transmission shaft 16 is assembled, the respective balls 11, 11 are not disposed in the outer-side preliminary concaves grooves 15a, 15a. Further, small concave grooves 21, 21 of which a radial depth size and a circumferential opening width are smaller than the outer-side concave groove 14a and the outer-side preliminary concave groove 15a are provided between each outer-side concave groove 14a and each outer-side preliminary concave groove 15a in the circumferential direction and between the outer-side preliminary concave grooves 15a, 15a adjacent to each other in the circumferential direction on the inner periphery surface of the outer shaft 10a. In this example, the inner periphery surface of the outer shaft 10a is formed with the respective outer-side preliminary concave grooves 15a, 15a and the respective small concave grooves 21, 21, in addition to the originally necessary outer-side concave grooves 14a, 14a. Thereby, the circumferential stiffness of the outer shaft 10a is lowered, so that the outer shaft 10a can be easily elastically deformed (i.e., diametrically enlarged).

Also, in this example, a cross-sectional shape of each outer-side concave groove 14a (and each outer-side preliminary concave groove 15a) is formed as a complex arc consisting of a plurality of arcs having different radii of curvature and made to smoothly continue. More specifically, the cross-sectional shape is a substantial Gothic arch shape where a pair of large diameter arc-shaped parts 19a, 19a provided at both sides in a width direction (circumferential direction) of each outer-side concave groove 14a is made to smoothly continue at a central portion in the width direction by a small diameter arc-shaped part 20a of which a radius of curvature is smaller than both the large diameter arc-shaped parts 19a, 19a. Also, the radius of curvature R14 of the large diameter arc-shaped part 19a is made to be greater than the radius of curvature R11 of the rolling surface of each ball 11 (R14>R11). Meanwhile, in this example, the cross sectional shape of each outer-side concave groove 14a is the same as the cross sectional shape of each inner-side concave groove 12a.

The respective balls 11, 11 are made of SUJ2, SUJ3, SCM420H or the like, for example. Also, the respective balls 11, 11 are arranged in series axially between the respective inner-side concave grooves 12a, 12a and the respective outer-side concave grooves 14a, 14a. Particularly, in this example, the balls 11, 11 are respectively arranged between the respective inner-side concave grooves 12a, 12a and the respective outer-side concave grooves 14a, 14a via the inside guide plate 17 and the outside guide plate 18.

The inside guide plate 17 is a metal plate of a stainless steel plate, a spring steel plate or the like, and has a substantially semi-cylindrical shape (a substantially C-shaped section) as a whole. Also, the inside guide plate 17 has a constant plate thickness t over the entirety, and has a pair of inside guide main body parts 22, 22 provided at both end portions in the circumferential direction and one inside coupling part 23 configured to couple both the inside guide main body parts 22, 22.

The inside guide main body part 22 has a sectional shape that is a concave arc shape concave radially inwards, and is formed by smoothly continuing a plurality of cylindrical portions having different radii of curvature. Specifically, a pair of large diameter cylindrical portions 24, 24 provided at both sides in the width direction (circumferential direction) is made to smoothly continue at a central portion in the width direction by a small diameter cylindrical portion 25 of which a radius of curvature is smaller than both the large diameter cylindrical portions 24, 24, so that each inside guide main body part 22 is configured. Also, a radius of curvature R17 of a radially outside surface of the large diameter cylindrical portion 24 is made to be greater than the radius of curvature R11 of the rolling surface of each ball 11 (R11<R17), and a radius of curvature R17+t of a radially inside surface of the large diameter cylindrical portion 24 is made to be smaller than the radius of curvature R12 of the large diameter arc-shaped part 19 of the inner-side concave groove 12a (R17+t<R12). In the meantime, a center of curvature of the radially inside surface of each inside guide main body part 22 (both the large diameter cylindrical portions 24, 24 and the small diameter cylindrical portion 25) and a center of curvature of the radially outside surface thereof are on the same axis, and the radially inside surface and the radially outside surface are made to be parallel with each other.

The inside coupling part 23 has an arc-shaped section, and a radius of curvature thereof at a free state is made to be slightly smaller than an outer diameter size of the outer periphery surface (a part deviating circumferentially from each of the concave grooves 12a, 13a) of the inner shaft 9a.

Figure 1:
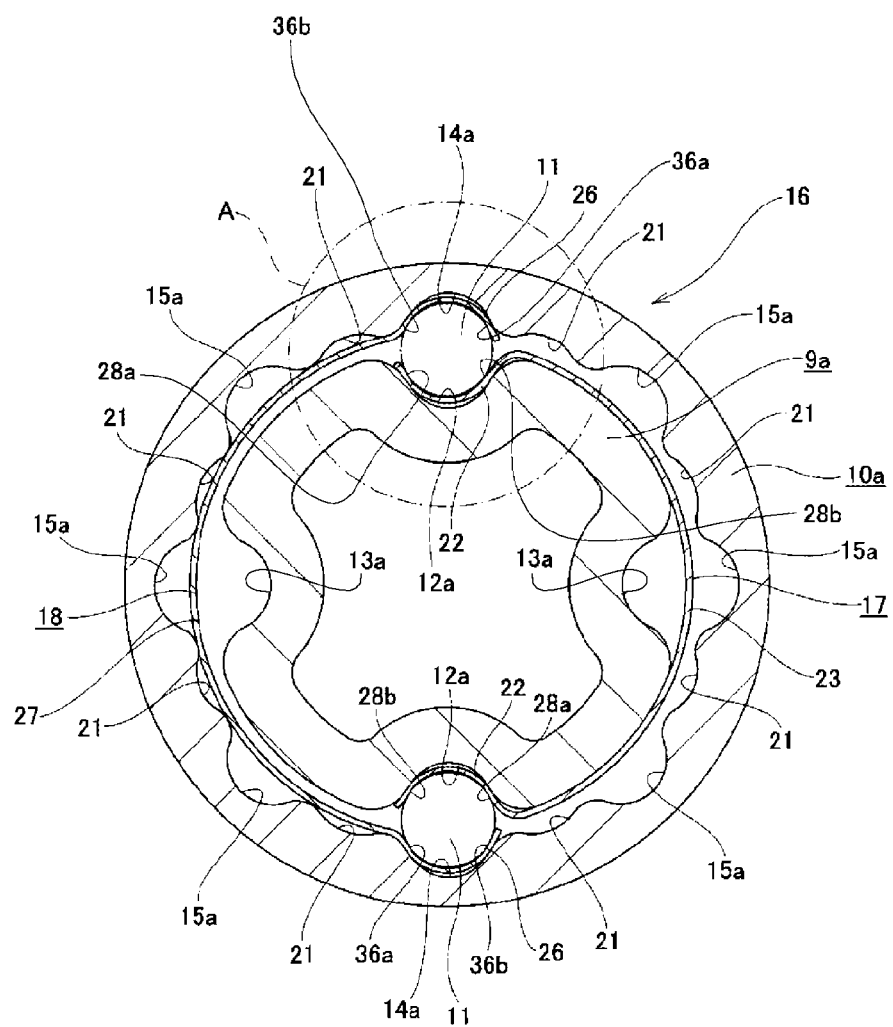
FIG. 1 is a sectional view depicting an extensible rotation transmission shaft of a first example of an embodiment.
Figure 2:
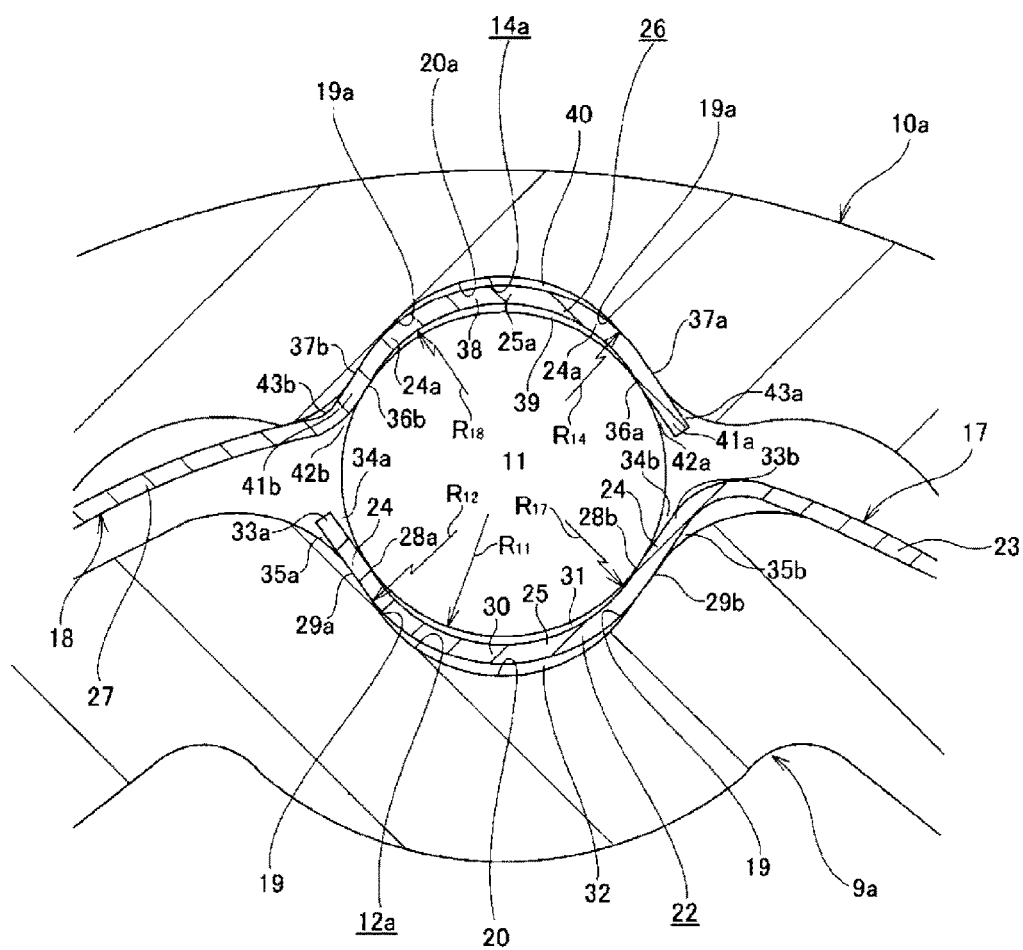
FIG. 2 is an enlarged view of an A-part of FIG. 1.
Figure 3A:
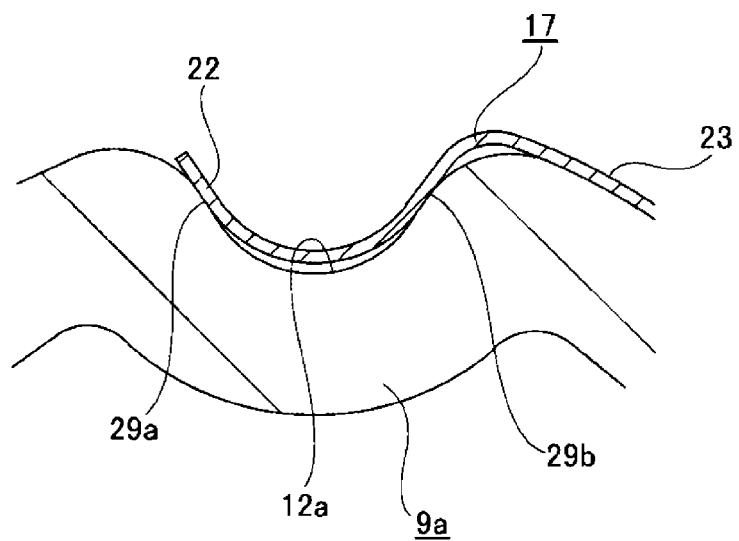
FIG. 3A is a sectional view depicting a state where an inside guide plate is mounted to an inner shaft.
Figure 4:
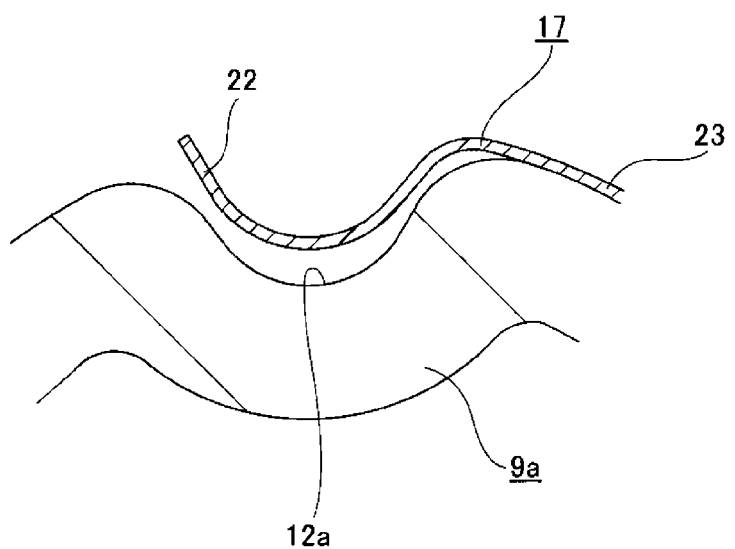
FIG. 4 is a sectional view depicting another example of the state where the inside guide plate is mounted to the inner shaft.

The inside guide plate 17 having the above-described configuration is mounted to the inner shaft 9a by fitting the inside coupling part 23 to the outer periphery surface of the inner shaft 9a with an interference. At this state, each inside guide main body part 22 is contacted to an outer surface of the inner-side concave groove 12a formed on the outer periphery surface of the inner shaft 9a only at two circumferentially set-apart positions (refer to inside support parts 29a, 29b to be described later), as shown in FIG. 3A, or the radially inside surface of each inside guide main body part 22 is entirely spaced slightly radially outwards from the outer surface of the inner-side concave groove 12a, as shown in FIG. 4. Also, at the mounted state, gaps based on the inner-side preliminary concave grooves 13a, 13a formed on the outer periphery surface of the inner shaft 9a are formed between an inner periphery surface of the inside coupling part 23 configuring the inside guide plate 17 and the outer periphery surface of the inner shaft 9a.

The outside guide plate 18 is a metal plate of a stainless steel plate, a spring steel plate or the like, and has a substantially semi-cylindrical shape (a substantially C-shaped section) as a whole, like the inside guide plate 17. Also, the outside guide plate 18 has a constant plate thickness t over the entirety, which is the same as the inside guide plate 17, and has a pair of outside guide main body parts 26, 26 provided at both end portions in the circumferential direction and one outside coupling part 27 configured to couple both the outside guide main body parts 26, 26.

Each of the outside guide main body parts 26, 26 has a sectional shape that is a concave arc shape concave radially outwards, and is formed by smoothly continuing a plurality of partial cylindrical portions having different radii of curvature. Specifically, a pair of large diameter cylindrical portions 24a, 24a provided at both sides in the width direction (circumferential direction) is made to smoothly continue at a central portion in the width direction by a small diameter cylindrical portion 25a of which a radius of curvature is smaller than both the large diameter cylindrical portions 24a, 24a, so that each of the outside guide main body parts 26, 26 is configured. Also, a radius of curvature R18 of a radially inside surface of the large diameter cylindrical portion 24a is made to be greater than the radius of curvature R11 of the rolling surface of each ball 11 (R11<R18), and a radius of curvature R18+t of a radially outside surface of the large diameter cylindrical portion 24a is made to be smaller than the radius of curvature R14 of the large diameter arc-shaped part 19a of the outer-side concave groove 14a (R18+t<R14). In the meantime, a center of curvature of the radially inside surface of each outside guide main body part 26 (both the large diameter cylindrical portions 24a, 24a and the small diameter cylindrical portion 25a) and a center of curvature of the radially outside surface thereof are on the same axis, and the radially inside surface and the radially outside surface are made to be parallel with each other.

The outside coupling part 27 has an arc-shaped section, and a radius of curvature thereof at a free state is made to be slightly greater than an inner diameter size of the inner periphery surface (a part deviating circumferentially from each of the concave grooves 14a, 15a, 21) of the outer shaft 10a.

Figure 3B:
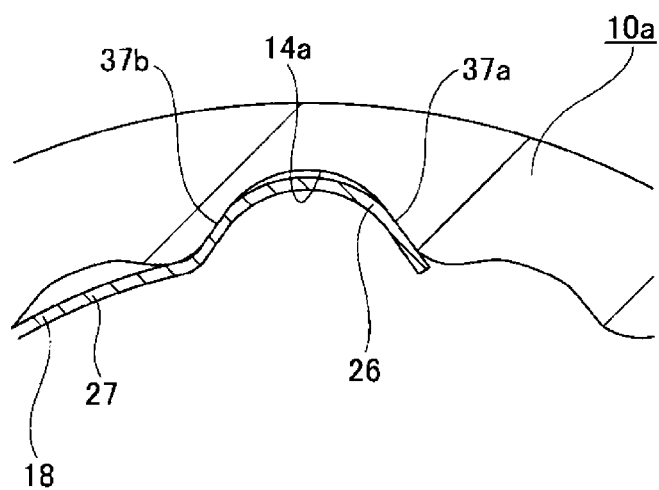
FIG. 3B is a sectional view depicting a state where an outside guide plate is mounted to an outer shaft.

The outside guide plate 18 having the above-described configuration is mounted to the outer shaft 10a by fitting the outside coupling part 27 to the inner periphery surface of the outer shaft 10a with an interference. At this state, each outside guide main body part 26 is contacted to an inner surface of the outer-side concave groove 14a formed on the outer periphery surface of the outer shaft 10a only at two circumferentially set-apart positions (refer to outside support parts 37a, 37b to be described later), as shown in FIG. 3B, or the radially outside surface of each outside guide main body part 26 is entirely spaced slightly radially inwards from the inner surface of the outer-side concave groove 14a (which is not shown). Also, at the mounted state, gaps based on the outer-side preliminary concave grooves 15a, 15a and small concave grooves 21, 21 formed on the inner periphery surface of the outer shaft 10a are formed between an outer periphery surface of the outside coupling part 27 configuring the outside guide plate 18 and the inner periphery surface of the outer shaft 10a.

Figure 5:
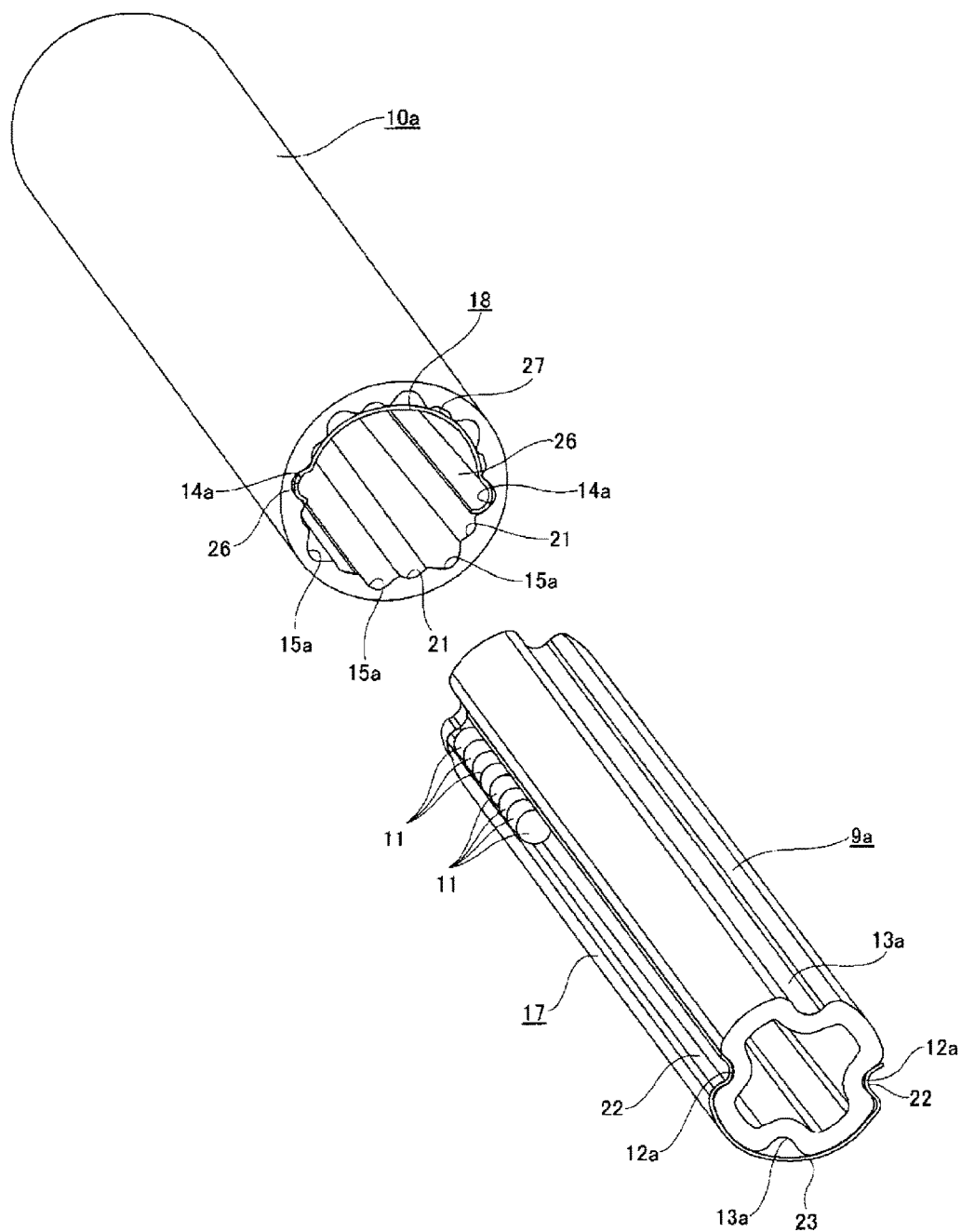
FIG. 5 is an exploded perspective view of the extensible rotation transmission shaft.

When assembling the extensible rotation transmission shaft 16 of this example, the inside guide plate 17 is mounted to (fitted onto) the inner shaft 9a and the outside guide plate 18 is mounted to (fitted into) the outer shaft 10a in advance as described above. Then, as shown in FIG. 5, the inner shaft 9a is inserted into the outer shaft 10a so that the plurality of balls 11, 11 is sandwiched with being aligned in series axially between the inside guide main body parts 22, 22 configuring the inside guide plate 17 and the outside guide main body parts 26, 26 configuring the outside guide plate 18. Particularly, in this example, the inner surfaces of the respective outer-side concave grooves 14a, 14a are pressed radially outwards via the outside guide plate 18 by the respective balls 11, 11, together with the insertion operation. Thereby, the entire outer shaft 10a including the inner surfaces of the respective outer-side concave grooves 14a, 14a is elastically deformed more radially outwards than a state before the assembling (the diameter of the outer shaft 10a is elastically enlarged). That is, in this example, the respective balls 11, 11 are preloaded, without the elastic forces of the inside guide plate 17 and the outside guide plate 18 (the preload by the elastic forces is substantially zero). In the meantime, as required, the inner surfaces of the respective outer-side concave grooves 14*a*, 14*a* may be elastically deformed, and the outer surface of each inner-side concave groove 13*a* (only the outer surface or the entire inner shaft 9*a* including the outer surface) may be elastically deformed more radially inwards than a state before the assembling.

Also, at a state where the rotational force is not transmitted between the inner shaft 9*a* and the outer shaft 10*a* after the extensible rotation transmission shaft 16 is assembled, the rolling surface of each ball 11 and the radially outside surface of each inside guide main body part 22 are contacted to each other only at the two circumferentially set-apart inside contact parts 28*a*, 28*b*. Also, only inside support parts 29*a*, 29*b* existing at portions (portions located on a backside and closest to the inside contact parts 28*a*, 28*b*) of the radially inside surface of the inside guide main body part 22, which correspond to the respective inside contact parts 28*a*, 28*a*, are supported by the outer surface of each inner-side concave groove 12*a*.

For this reason, a first inside non-contact part 30 of which a radially outside surface is not contacted to the rolling surface of each ball 11 and a radially inside surface is not contacted to the outer surface of each inner-side concave groove 12*a* is provided between the two inside contact parts 28*a*, 28*a* (the inside support parts 29*a*, 29*b*) of each inside guide main body part 22. A first inside gap 31 having a substantial crescent shape is formed between the radially outside surface of the first inside non-contact part 30 and the rolling surface of each ball 11, and a second inside gap 32 having a substantial crescent shape is formed between the radially inside surface of the first inside non-contact part 30 and the outer surface of each inner-side concave groove 12*a*. Also, a pair of second inside non-contact parts 33*a*, 33*b* of which radially outside surfaces are not contacted to the rolling surface of each ball 11 and radially inside surfaces are not contacted to the outer surface of the inner-side concave groove 12*a* is provided at both circumferential portions of the two inside contact parts 28*a*, 28*b* (the inside support parts 29*a*, 29*b*) of each inside guide main body part 22. Third inside gaps 34*a*, 34*b* having a substantial wedge shape are respectively formed between the radially outside surfaces of the second inside non-contact parts 33*a*, 33*b* and the rolling surface of each ball 11, and fourth inside gaps 35*a*, 35*b* having a substantial wedge shape are formed between the radially inside surfaces of the second inside non-contact parts 33*a*, 33*b* and the outer surface of each inner-side concave groove 12*a*.

Regarding the above configuration, the rolling surface of each ball 11 and the radially inside surface of the outside guide main body part 26 configuring the outside guide plate 18 are contacted only at two circumferentially set-apart outside contact parts 36*a*, 36*b*. Also, only outside support parts 37*a*, 37*b* existing at portions (portions located on a backside and closest to the outside contact parts 36*a*, 36*b*) of the racially outside surface of each outside guide main body part 26, which correspond to the respective outside contact parts 36*a*, 36*b*, are supported by the inner surface of each outer-side concave groove 14*a*.

For this reason, a first outside non-contact part 38 of which a radially inside surface is not contacted to the rolling surface of each ball 11 and a radially outside surface is not contacted to the inner surface of each outer-side concave groove 14*a* is provided between the two outside contact parts 36*a*, 36*b* (the outside support parts 37*a*, 37*b*) of each outside guide main body part 26. A first outside gap 39 having a substantial crescent shape is formed between the radially inside surface of the first outside non-contact part 38 and the rolling surface of each ball 11, and a second outside gap 40 having a substantial crescent shape is formed between the radially outside surface of the first outside non-contact part 38 and the inner surface of each outer-side concave groove 14*a*. Also, a pair of second outside non-contact parts 41*a*, 41*b* of which radially inside surfaces are not contacted to the rolling surface of each ball 11 and radially outside surfaces are not contacted to the inner surface of the outer-side concave groove 14*a* is provided at both circumferential portions of the two outside contact parts 36*a*, 36*b* (the outside support parts 37*a*, 37*b*) of the outside guide main body part 26. Third outside gaps 42*a*, 42*b* having a substantial wedge shape are respectively formed between the radially inside surfaces of the second outside non-contact parts 41*a*, 41*b* and the rolling surface of each ball 11, and fourth outside gaps 43*a*, 43*b* having a substantial wedge shape are formed between the radially outside surfaces of the second outside non-contact parts 41*a*, 41*b* and the inner surface of each outer-side concave groove 14*a*.

Also, as described above, at a state where the inside guide plate 17 and the outside guide plate 18 are incorporated, the inside contact part 28*a* and the inside support part 29*a* are located on the same line passing through centers of the respective balls 11 and the outside contact part 36*a* and the outside support part 37*a* are located on the same line passing through centers of the respective balls 11. Likewise, the inside contact part 28*b* and the inside support part 29*b* are located on the same line passing through the centers of the respective balls 11 and the outside contact part 36*b* and the outside support part 37*b* are located on the same line passing through the centers of the respective balls 11. In this example, an intersection angle (contact angle) between both the lines is set to about 60° to 80°.

As described above, the extensible rotation transmission shaft 16 of this example is configured by combining the inner shaft 9*a* and the outer shaft 10*a* via the respective balls 11, 11, the inside guide plate 17 and the outside guide plate 18 so that the rotational force can be transmitted therebetween and the axial relative displacement can be made. According to the extensible rotation transmission shaft 16 of this example having the above configuration, it is possible to implement the structure capable of suppressing the rattling while preventing the damage to the inside guide plate 17 and the outside guide plate 18 and the wears of the respective parts.

That is, according to this example, the respective balls 11, 11 are not preloaded depending on the elastic forces of the inside guide plate 17 and the outside guide plate 18, and the respective balls 11, 11 are preloaded using the inner surfaces (the outer shaft 10*a* configured to elastically enlarge the diameter thereof) of the respective outer-side concave grooves 14*a*, 14*a* configured to elastically deform radially outwards at the assembled state, so that the rattling of the extensible rotation transmission shaft 16 is suppressed. For this reason, it is possible to implement the structure capable of suppressing the rattling of the extensible rotation transmission shaft 16 without causing the high bending deformation to the inside guide plate 17 and the outside guide plate 18 at the state after the extensible rotation transmission shaft 16 is assembled. Particularly, like the structure shown in FIG. 3, at the state where the inside guide plate 17 and the outside guide plate 18 are respectively mounted to the inner shaft 9*a* and the outer shaft 10*a*, when postures (attaching positions) of the inside guide main body parts 22, 22 configuring the inside guide plate 17 and the outside guide main body parts 26, 26 configuring the outside guide plate 18 are the same as postures after the assembling is completed, it is possible to make the bending deformation substantially zero at the assembled state.

Also, according to this example, the inside support parts 29a, 29b of the inside guide plate 17, which are located on the backside of the inside contact parts 28a, 28b configured to contact the rolling surface of each ball 11, are supported by the outer surface of the inner-side concave groove 12a. The outside support parts 37a, 37b of the outside guide plate 18, which are located on the backside of the outside contact parts 36a, 36b configured to contact the rolling surface of each ball 11, are supported by the inner surface of the outer-side concave groove 14a. For this reason, when transmitting the rotational force between the inner shaft 9a and the outer shaft 10a, the portions contacting the rolling surface of each ball 11 are a total of four locations of the inside contact parts 28a, 28b and the outside contact parts 36a, 36b or three or two locations thereof (a total of two locations of one location of the inside contact part and one location of the outside contact part). In any case, it is possible to prevent the high bending deformation from being caused to both inside and outside guide plates 17, 18. Also, when the inner shaft 9a and the outer shaft 10a are relatively displaced axially, it is possible to prevent the high tensile deformation from being caused to both the inside and outside guide plates 17, 18, which the tensile deformation is caused as the respective balls 11, 11 roll on both the inside and outside guide plates 17, 18.

Further, according to this example, as described above, at the assembled state and when transmitting the rotational force, since it is possible to prevent the high bending deformation from being caused to both the inside and outside guide plates 17, 18, even though both the inside and outside guide plates 17, 18 and the outer periphery surface of the inner shaft 9a or the inner periphery surface of the outer shaft 10a are contacted each other, it is possible to prevent the wear from being excessively caused at the corresponding contact parts.

As a result, according to the extensible rotation transmission shaft 16 of this example, it is possible to implement the structure capable of suppressing the rattling while preventing the damage to the inside guide plate 17 and the outside guide plate 18 and the wears of the respective parts.

Further, according to this example, the inner-side concave grooves 12a, 12a are provided at the two positions on the outer periphery surface of the inner shaft 9a, at which the inner-side concave grooves are shifted in circumferential phase 180° relative to each other, the outer-side concave grooves 14a, 14a are provided at the two positions on the inner periphery surface of the outer shaft 10a, at which the outer-side concave grooves correspond to the two inner-side concave grooves 12a, 12a, and the plurality of balls 11, 11 is arranged in two lines between the two inner-side concave grooves 12a, 12a and the two outer-side concave grooves 14a, 14a.

In this way, when the plurality of balls 11 is serially arranged in two lines, the two inner-side preliminary concave grooves 13a, 13a are preferably arranged at the positions at which the two inner-side preliminary concave grooves are shifted in circumferential phase 90° with respect to the two inner-side concave grooves 12a, 12a (the balls 11, 11 of two lines), like this example. That is, as compared to the configuration where only the two inner-side concave grooves 12a, 12a are provided, when the inner-side preliminary concave grooves 13a, 13a are further provided and the four concave grooves 12a, 12a, 13a, 13a are equidistantly provided on the outer periphery surface of the inner shaft 9a, the groove processing can be made easily and stably. Also, the inner-side preliminary concave grooves 13a, 13a are formed in addition to the inner-side concave grooves 12a, 12a, so that the circumferential stiffness of the inner shaft 9a is lowered and thus the inner shaft 9a can be more easily elastically deformed (diametrically reduced).

Also, since the inner shaft 9a has the hollow cylinder shape, the circumferential stiffness of the inner shaft 9a is lowered and thus the inner shaft 9a can be more easily elastically deformed (diametrically reduced).

Also, the inner periphery surface of the outer shaft 10a is provided with the two outer-side preliminary concave grooves 15a, 15a at the positions at which the two outer-side preliminary concave grooves are shifted in circumferential phase 90° with respect to the two outer-side concave grooves 14a, 14a. In this way, when the outer-side preliminary concave grooves 15a, 15a are further provided and the four concave groove 14a, 14a, 15a, 15a are equidistantly provided on the inner periphery surface of the outer shaft 10a, the groove processing can be made easily and stably, as compared to the configuration where only the two outer-side concave grooves 14a, 14a are provided. Also, the outer-side preliminary concave grooves 15a, 15a are formed in addition to the outer-side concave grooves 14a, 14a, so that the circumferential stiffness of the outer shaft 10a is lowered and thus the outer shaft 10a can be more easily elastically deformed (diametrically reduced).

[Second Example of Embodiment]

Figure 6:
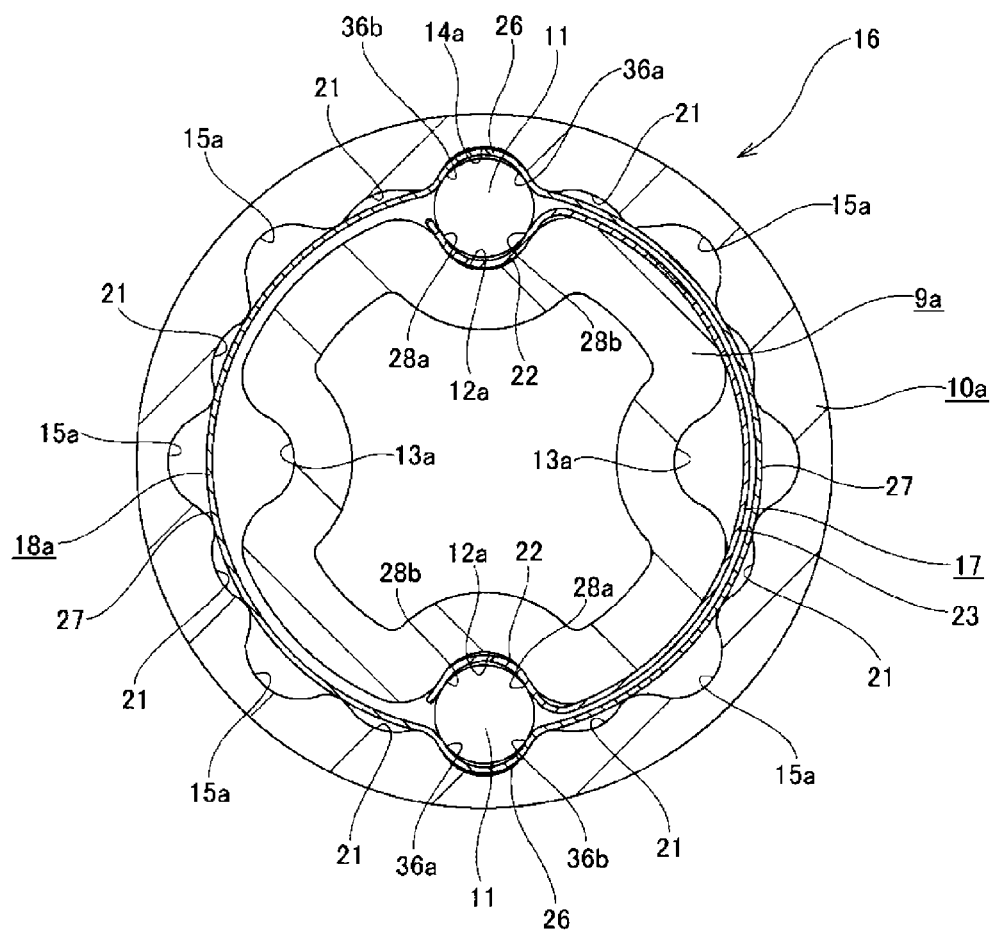
FIG. 6 is a sectional view equivalent to FIG. 1, depicting a second example of the embodiment.

A second example of the embodiment of the present invention is described with reference to FIG. 6. This example is characterized in that an outside guide plate 18a has a cylindrical shape and a pair of outside guide main body parts 26, 26 and a pair of outside coupling parts 27, 27 are made to alternately continue in the circumferential direction. According to this example having the configuration, since it is possible to mount the outside guide plate 18a to the inner periphery surface of the outer shaft 10a by using the elastic forces of the two outside coupling parts 27, 27, it is possible to improve the support stiffness of the inner periphery surface of the outer shaft 10a.

The other configurations and operational effects are the same as the first example of the embodiment.

[Third Example of Embodiment]

Figure 7:
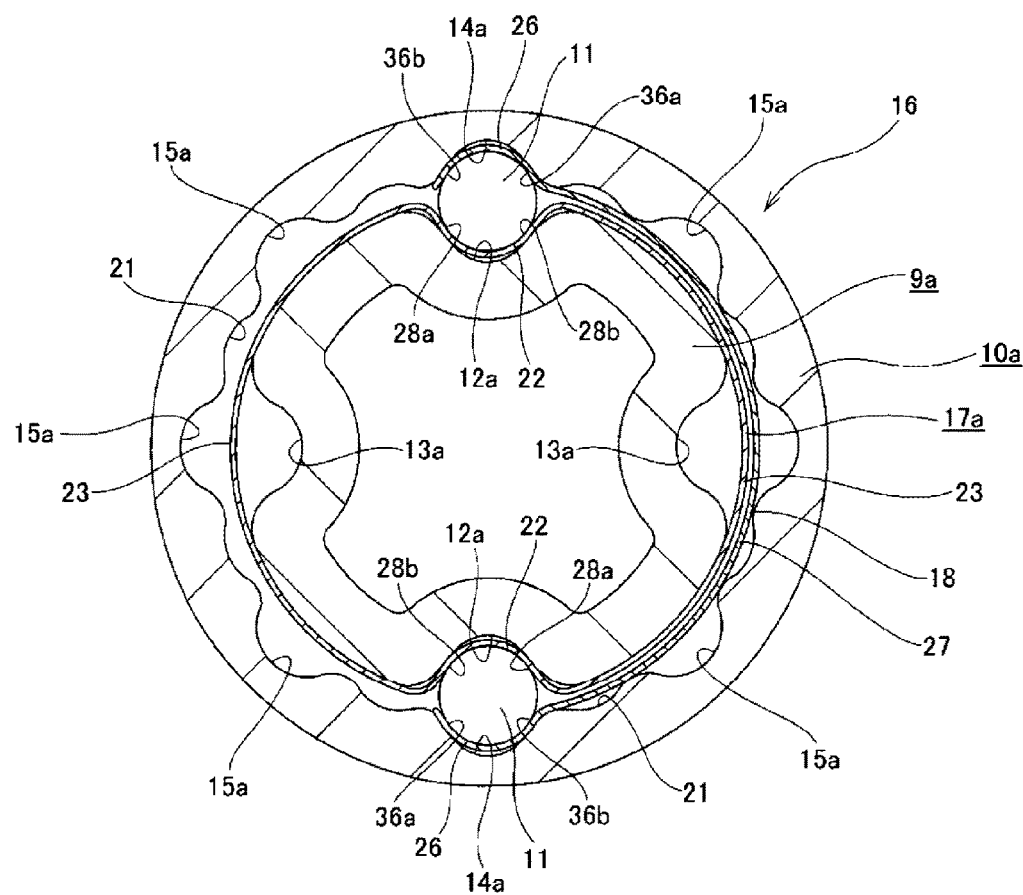
FIG. 7 is a sectional view equivalent to FIG. 1, depicting a third example of the embodiment.

A third example of the embodiment of the present invention is described with reference to FIG. 7. This example is characterized in that an inside guide plate 17a has a cylindrical shape and a pair of inside guide main body parts 22, 22 and a pair of inside coupling parts 23, 23 are made to alternately continue in the circumferential direction. According to this example having the configuration, since it is possible to mount the inside guide plate 17a to the outer periphery surface of the inner shaft 9a by using the elastic forces of the two inside coupling parts 23, 23, it is possible to improve the support stiffness of the outer periphery surface of the inner shaft 9a.

The other configurations and operational effects are the same as the first example of the embodiment.

[Fourth Example of Embodiment]

Figure 8:
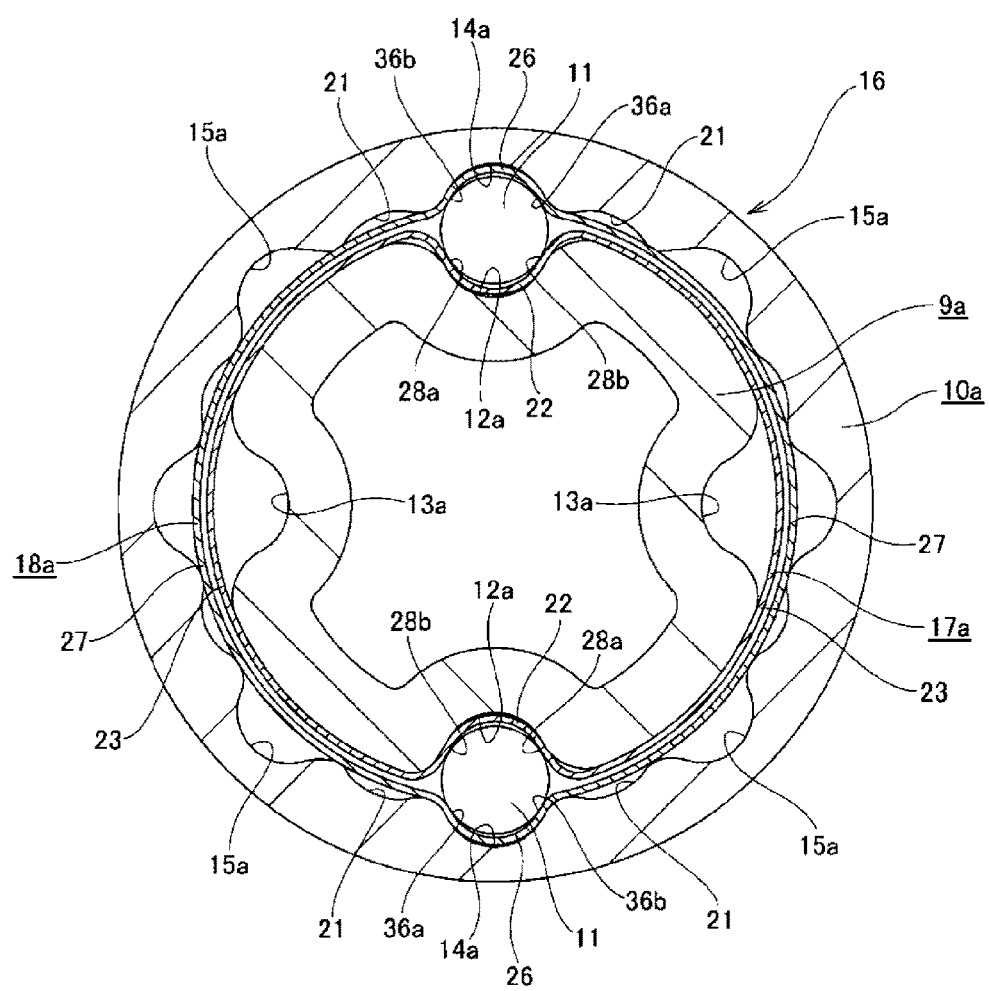
FIG. 8 is a sectional view equivalent to FIG. 1, depicting a fourth example of the embodiment.

A fourth example of the embodiment of the present invention is described with reference to FIG. 8. This example is characterized in that the features of the second and third examples of the embodiment are combined. That is, the outside guide plate 18a has a cylindrical shape as a whole, the pair of outside guide main body parts 26, 26 and the pair of outside coupling parts 27, 27 are made to alternately continue in the circumferential direction, the inside guide plate 17a has a cylindrical shape as a whole and the pair of inside guide main body parts 22, 22 and the pair of inside coupling parts 23, 23 are made to alternately continue in the circumferential direction. According to this example having the configuration, it is possible to improve the support stiffness of the outside guide plate 18a and the inside guide plate 17a.

The other configurations and operational effects are the same as the first, second and third examples of the embodiment.

[Fifth Example of Embodiment]

Figure 9:
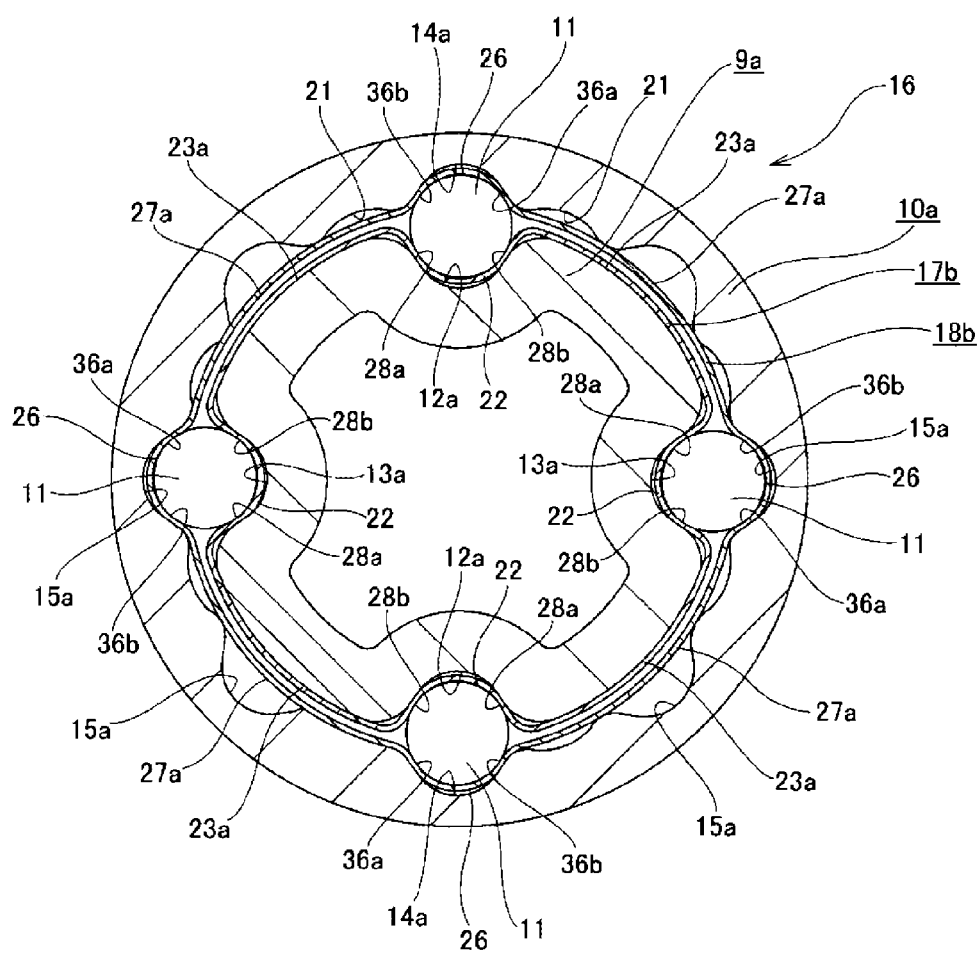
FIG. 9 is a sectional view equivalent to FIG. 1, depicting a fifth example of the embodiment.

A fifth example of the embodiment of the present invention is described with reference to FIG. 9. This example is characterized in that the respective balls 11, 11 are arranged between the inner-side preliminary concave grooves 13a, 13a and the outer-side preliminary concave grooves 15a, 15a, unlike the first example of the embodiment where the balls 11, 11 are not arranged therebetween. To this end, according to this example, an inside guide plate 17b having a cylindrical shape as a whole and having the inside guide main body parts 22, 22 provided at four circumferentially equidistant locations and inside coupling parts 23a, 23a configured to couple the inside guide main body parts 22, 22 circumferentially adjacent to each other is used. Also, an outside guide plate 18b having a cylindrical shape as a whole and having the outside guide main body parts 26, 26 provided at four circumferentially equidistant locations and outside coupling parts 27a, 27a configured to couple the outside guide main body parts 26, 26 circumferentially adjacent to each other is used. The four inside guide main body parts 22, 22 are respectively arranged in the pair of inner-side concave grooves 12a, 12a and the pair of inner-side preliminary concave grooves 13a, 13a, and the four outside guide main body parts 26, 26 are respectively arranged in the pair of outer-side concave grooves 14a, 14a and the pair of outer-side preliminary concave grooves 15a, 15a. The respective balls 11, 11 are arranged in series axially between the respective inner-side concave grooves 12a, 12a and the respective outer-side concave grooves 14a, 14a and between the respective inner-side preliminary concave grooves 13a, 13a and the respective outer-side preliminary concave grooves 15a, 15a via the respective inside guide main body parts 22, 22 and the respective outside guide main body parts 26, 26. According to this example having the configuration, since the ball lines arranged in series axially are provided at the four circumferential locations, it is possible to prevent the rattling between the inner shaft 9a and the outer shaft 10a more effectively.

The other configurations and operational effects are the same as the first example of the embodiment.

[Sixth Example of Embodiment]

Figure 10:
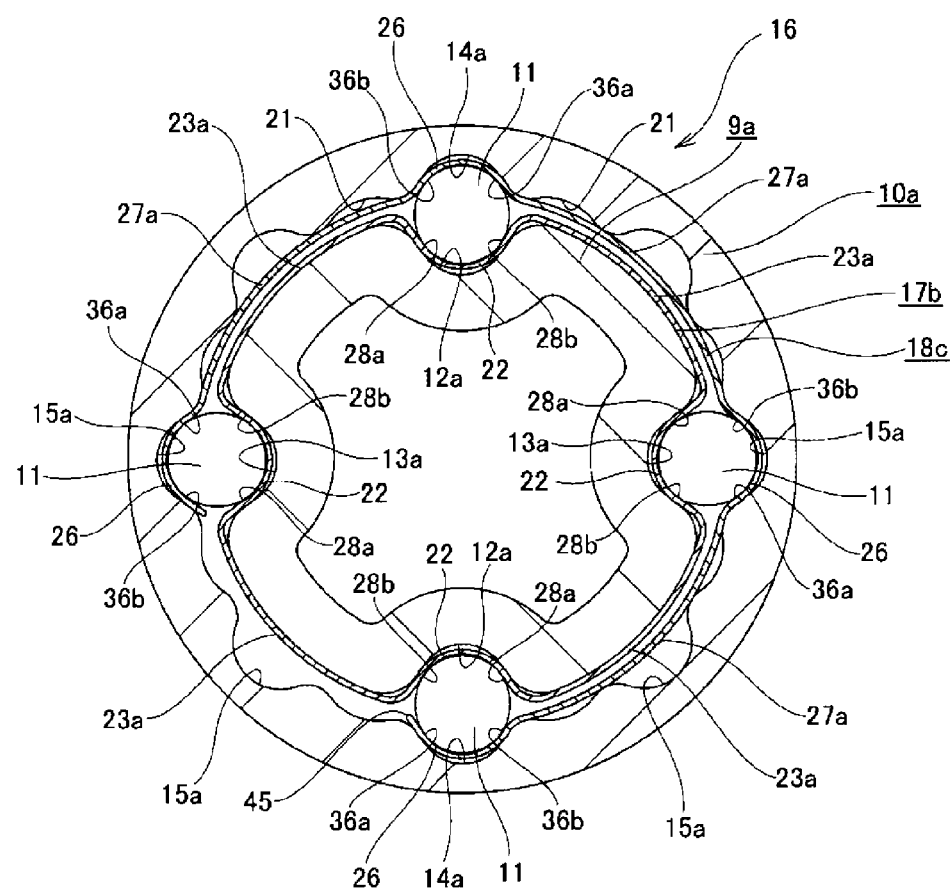
FIG. 10 is a sectional view equivalent to FIG. 1, depicting a sixth example of the embodiment.

A sixth example of the embodiment of the present invention is described with reference to FIG. 10. This example is characterized in that a shape of an outside guide plate 18c is contrived with respect to the structure of the fifth example of the embodiment. That is, according to this example, the outside guide plate 18c has a notched cylinder shape having a discontinuous part 45 at one circumferential location, and has the outside guide main body parts 26, 26 provided at four circumferentially equidistant locations and three outside coupling parts 27a, 27a. In other words, the outside guide plate 18c of this example has a structure where the one outside coupling part 27a is omitted from the outside guide plate 18b of the fifth example of the embodiment. According to this example having the configuration, since the outside guide plate 18c can be easily enlarged/reduced radially, it is possible to improve the mounting operability and the support stiffness of the inner periphery surface of the outer shaft 10a.

The other configurations and operational effects are the same as the first and fifth examples of the embodiment.

[Seventh Example of Embodiment]

Figure 11:
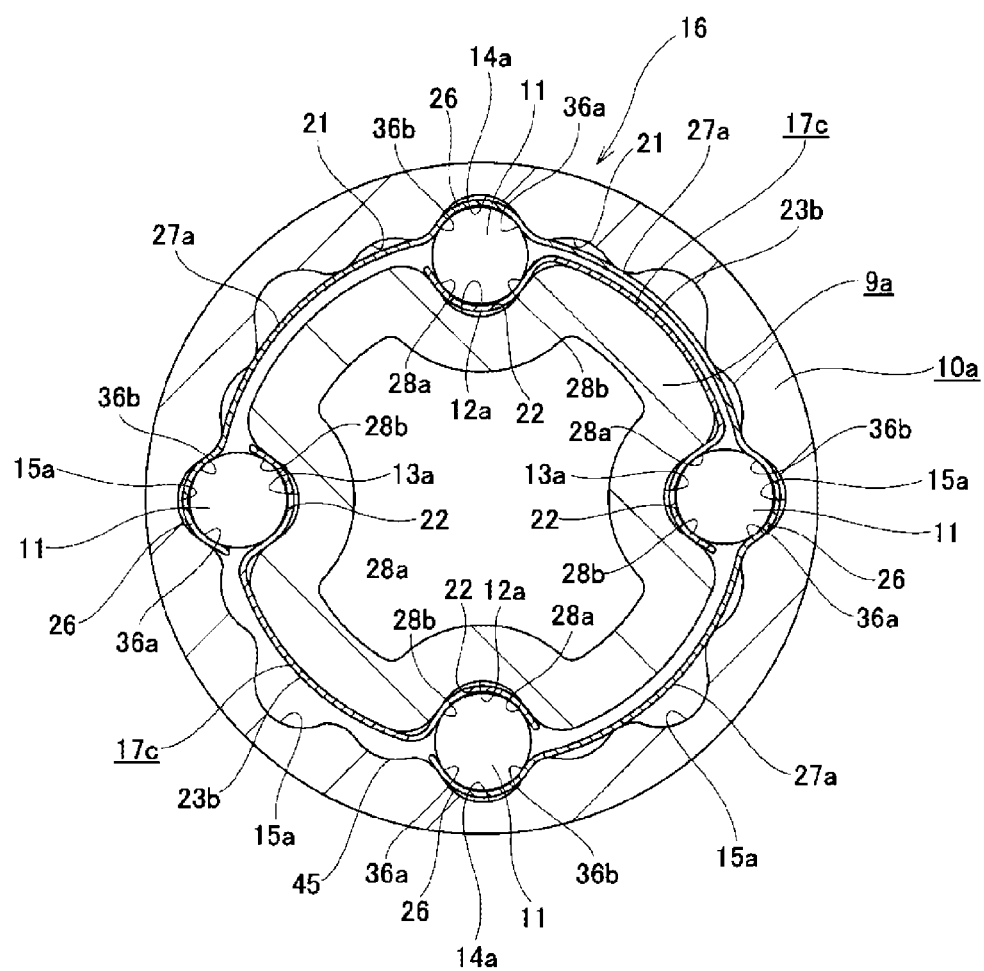
FIG. 11 is a sectional view equivalent to FIG. 1, depicting a seventh example of the embodiment.

A seventh example of the embodiment of the present invention is described with reference to FIG. 11. This example is characterized in that a shape of an inside guide plate 17c is contrived with respect to the structure of the sixth example of the embodiment. That is, according to this example, the two inside guide plates 17c having a partially cylindrical shape (about ¼ cylindrical shape) are mounted to the outer periphery surface of the inner shaft 9a. Each of the inside guide plates 17c has a pair of inside guide main body parts 22, 22 provided at both circumferential end portions and one inside coupling part 23b configured to couple both the inside guide main body parts 22, 22. In this example, the two inside guide plates 17c, 17c are mounted at diametrically opposite positions of the inner shaft 9a. According to this example having the configuration, since it is possible to omit the one inside coupling part 23a, as compared to the structure of the sixth example, it is possible to save the manufacturing cost.

The other configurations and operational effects are the same as the first and sixth examples of the embodiment.

[Eighth Example of Embodiment]

Figure 12:
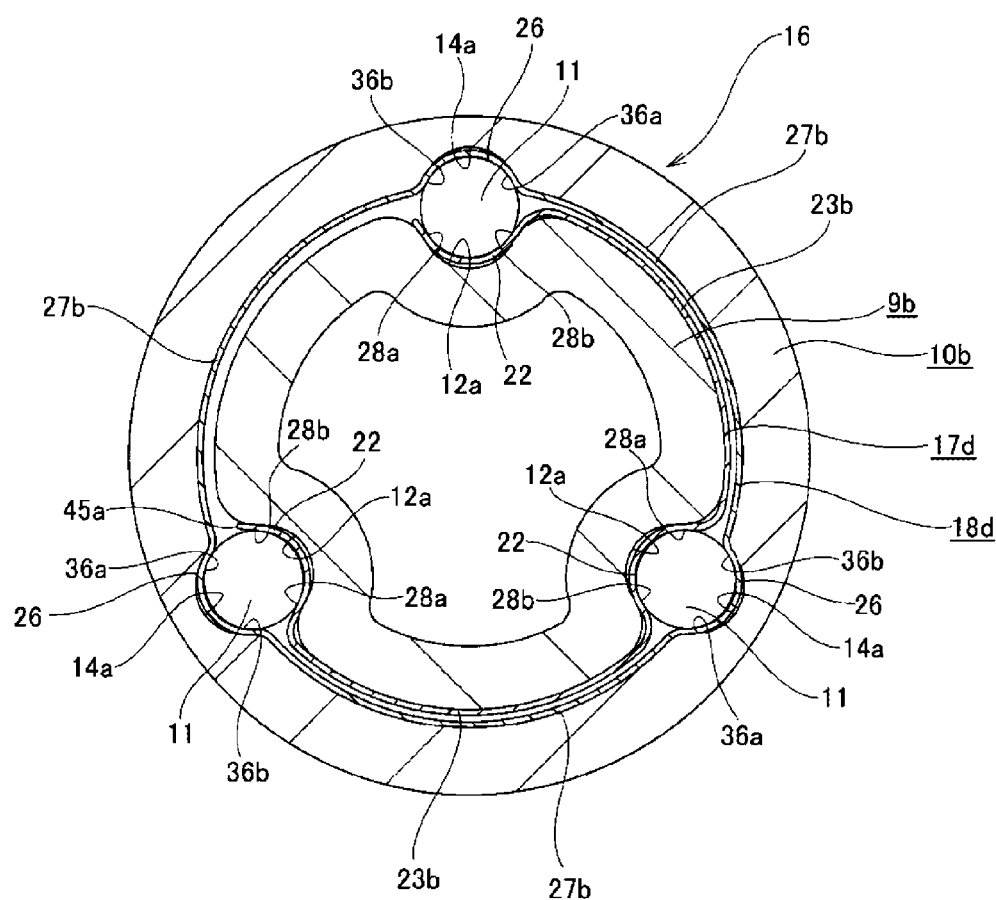
FIG. 12 is a sectional view equivalent to FIG. 1, depicting an eighth example of the embodiment.

An eighth example of the embodiment of the present invention is described with reference to FIG. 12. In this example, an inner shaft 9b has a hollow cylinder shape. Also, the inner-side concave grooves 12a, 12a recessed radially inwards and extended axially are respectively provided at three circumferentially equidistant locations (positions shifted in circumferential phase 120°) of the outer periphery surface of the inner shaft 9b. Also, an outer shaft 10b into which the inner shaft 9b is to be inserted has a hollow cylinder shape. Also, the outer-side concave grooves 14a, 14a recessed radially outwards and extended axially are respectively formed axially at three circumferential locations of an inner periphery surface of the outer shaft 10b, at which the outer-side concave grooves correspond to the inner-side concave grooves 12a, 12a. In this example, the inner-side preliminary concave groove 13a, the outer-side preliminary concave groove 15a and the small concave groove 21, which are provided for the structure of the first example of the embodiment, are omitted.

Also, in this example, an inside guide plate 17d has a notched cylinder shape having a discontinuous part 45a at one circumferential location. Also, the inside guide plate 17d has inside guide main body parts 22, 22 provided at three circumferentially equidistant locations and two inside coupling part 23b, 23b. The outside guide plate 18d has a cylindrical shape as a whole. Also, the outside guide plate 18d has outside guide main body parts 26, 26 provided at three circumferentially equidistant locations and three outside coupling parts 27b, 27b configured to couple the outside guide main body parts 26, 26 adjacent to each other in the circumferential direction. The respective balls 11, 11 are arranged in series axially between the respective inner-side concave grooves 12a, 12a and the respective outer-side concave grooves 14a, 14a via the respective inside guide main body parts 22, 22 and the respective outside guide main body parts 26, 26. According to this example having the configuration, since the ball lines arranged in series axially are provided at the three circumferential locations, it is possible to prevent the rattling between the inner shaft 9b and the outer shaft 10b more effectively, as compared to the structure where the ball lines are provided only at the two circumferential locations.

The other configurations and operational effects are the same as the first example of the embodiment.

[Ninth Example of Embodiment]

Figure 13:
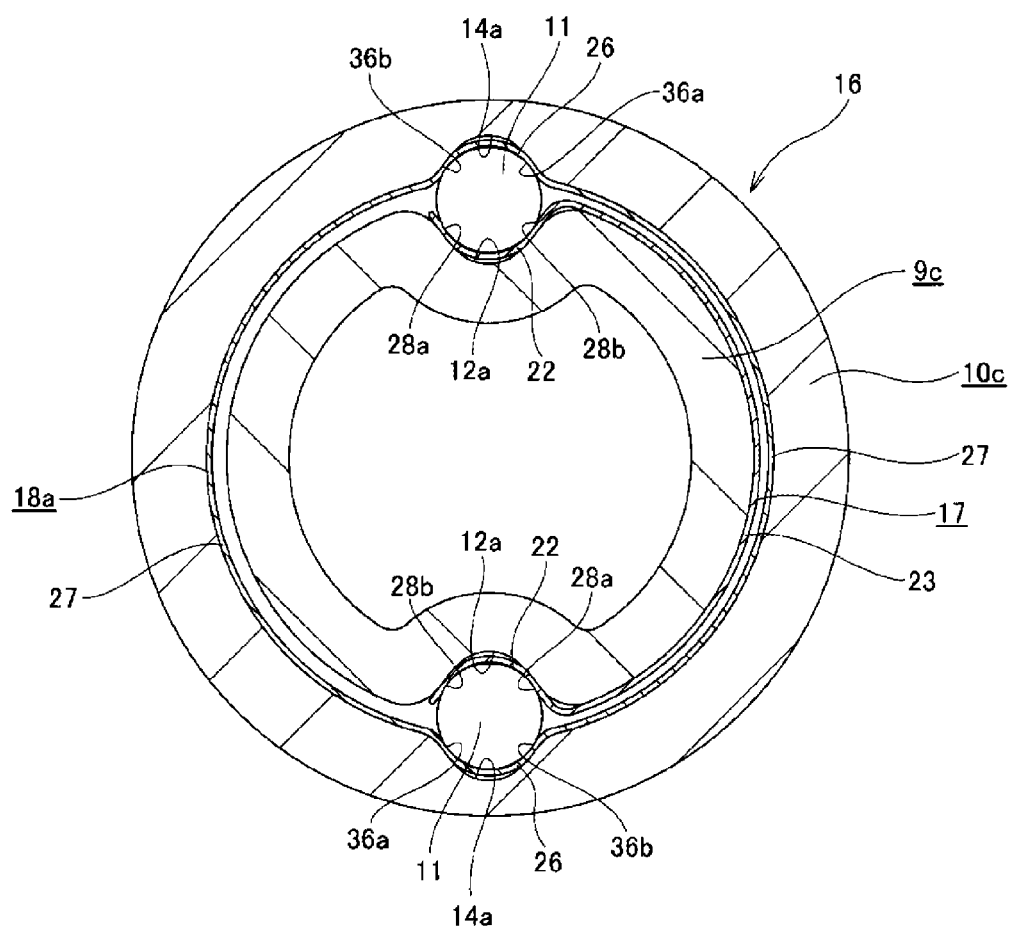
FIG. 13 is a sectional view equivalent to FIG. 1, depicting a ninth example of the embodiment.

A ninth example of the embodiment of the present invention is described with reference to FIG. 13. In this example, the inner-side concave grooves 12a, 12a recessed radially inwards and extended axially are respectively provided at two circumferentially equidistant locations of an outer periphery surface of an inner shaft 9c. The other part of the outer periphery surface of the inner shaft 9c has a cylindrical surface shape. Also, an outer shaft 10c into which the inner shaft 9c is to be inserted has a hollow cylinder shape. Also, the outer-side concave grooves 14a, 14a recessed radially outwards and extended axially are respectively formed axially at two circumferential locations of an inner periphery surface of the outer shaft 10c, at which the outer-side concave grooves correspond to the inner-side concave grooves 12a, 12a, and the other part has a cylindrical surface shape. In this example, the inner-side preliminary concave groove 13a, the outer-side preliminary concave groove 15a and the small concave groove 21, which are provided for the structure of the first example of the embodiment, are omitted. According to this example having the configuration, since it is not necessary to form the respective concave grooves 13a, 15a, 21, it is possible to save the processing cost.

The other configurations and operational effects are the same as the first and sixth examples of the embodiment.

[Tenth Example of Embodiment]

Figure 14:
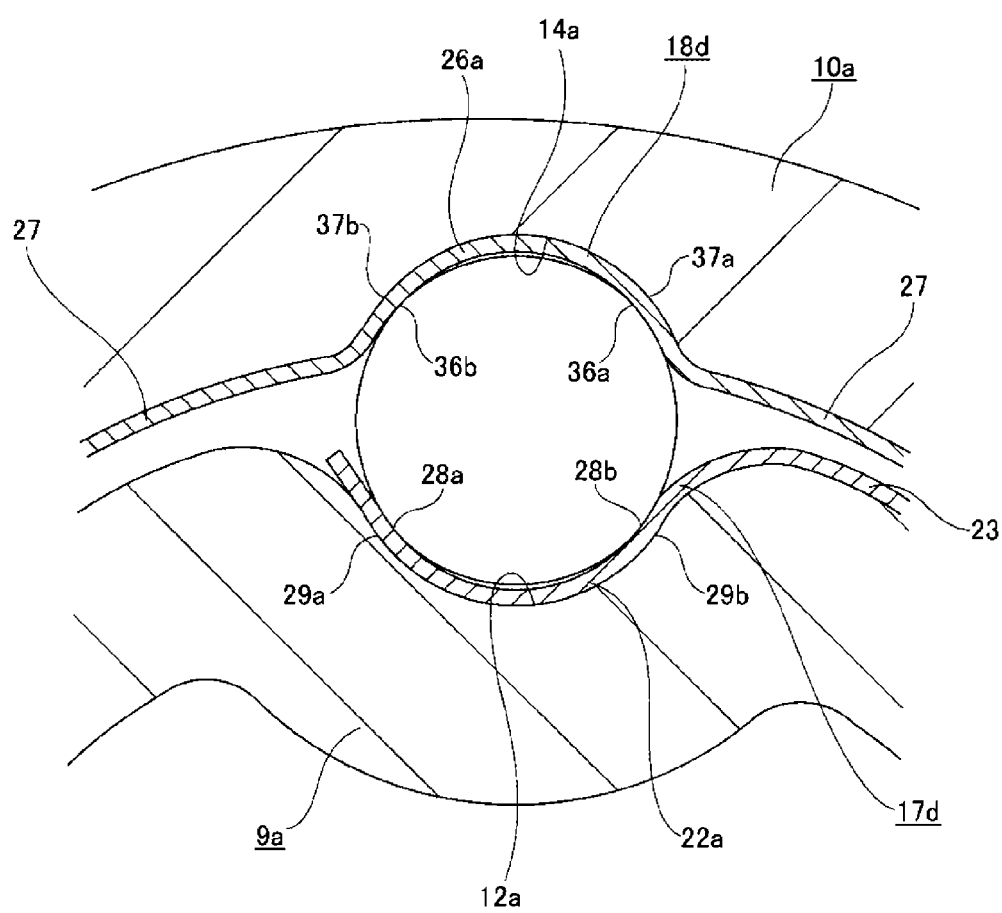
FIG. 14 is a sectional view equivalent to FIG. 2, depicting a tenth example of the embodiment.

A tenth example of the embodiment of the present invention is described with reference to FIG. 14. This example is characterized in that a contact state between a racially inside surface of an inside guide main body part 22a configuring an inside guide plate 17d and the outer surface of the inner-side concave groove 12a is contrived and a contact state between a radially outside surface of an outside guide main body part 26a configuring an outside guide plate 18d and the inner surface of the outer-side concave groove 14a is contrived.

That is, in this example, the radially inside surface of the inside guide main body part 22a is contacted to the two inside support parts 29a, 29b spaced circumferentially, and both the inside support parts 29a, 29b are also contacted to the outer surface of the inner-side concave groove 12a therebetween. Also, the radially outside surface of the outside guide main body part 26a is contacted to the two outside support parts 37a, 37b spaced circumferentially, and both the outside support parts 37a, 37b are also contacted to the inner surface of the outer-side concave groove 14a therebetween. According to this example having the configuration, it is possible to more effectively prevent the bending deformation and the tensile deformation of both the inside and outside guide plates 17d, 18d.

The other configurations and operational effects are the same as the first example of the embodiment.

INDUSTRIAL APPLICABILITY

When implementing the present invention, the structures of the respective of the embodiment can be appropriately combined. Also, the shapes, structures and materials of the respective constitutional parts can be variously changed and implemented. Also, the extensible rotation transmission shaft of the present invention can be preferably applied for an intermediate shaft or a steering shaft of the constitutional members of a steering device for an automobile having an electric power steering device. Further, the extensible rotation transmission shaft is not limited to the shaft configuring the steering device for an automobile and can also be implemented as a shaft for rotation transmission configuring a variety of rotary machine devices such as a working machine, a plaything and the like.

The subject application is based on a Japanese Patent Application No. 2014-137845 filed on Jul. 3, 2014, which is herein incorporated for reference.

DESCRIPTION OF REFERENCE NUMERALS

1: steering wheel, 2: steering gear unit, 3: steering shaft, 4, 4a: universal joint, 5: intermediate shaft, 6: input shaft, 7: tie-rod, 8: electric motor, 9, 9a, 9b, 9c: inner shaft, 10, 10a, 10b, 10c: outer shaft, 11: ball, 12, 12a: inner-side concave groove, 13, 13a: inner-side preliminary concave groove, 14, 14a: outer-side concave groove, 15, 15a: outer-side preliminary concave groove, 16: extensible rotation transmission shaft, 17, 17a, 17b, 17c, 17d: inside guide plate, 18, 18a, 18b, 18c, 18d: outside guide plate, 19, 19a: large diameter arc-shaped part, 20, 20a: small diameter arc-shaped part, 21: small concave groove, 22: inside guide main body part, 23, 23a, 23b: inside coupling part, 24, 24a: large diameter cylindrical portion, 25, 25a: small diameter cylindrical portion, 26: outside guide main body part, 27, 27a, 27b: outside coupling part, 28a, 28b: inside contact part, 29a, 29b: inside support part, 30: first inside non-contact part, 31: first inside gap, 32: second inside gap, 33a, 33b: second inside non-contact part, 34a, 34b: third inside gap, 35a, 35b: fourth inside gap, 36a, 36b: outside contact part, 37a, 37b: outside support part, 38: first outside non-contact part, 39: first outside gap, 40: second outside gap, 41a, 41b: second outside non-contact part, 42a, 42b: third outside gap, 43a, 43b: fourth outside gap, 45, 45a: discontinuous part

The invention claimed is:

1. An extensible rotation transmission shaft comprising:
an inner shaft having an inner-side concave groove recessed radially inwards and extended axially provided at least one circumferential location of an outer periphery surface thereof;
an outer shaft having a hollow cylinder shape into which the inner shaft can be inserted and having an outer-side concave groove recessed radially outwards and extended axially provided at least one circumferential location of an inner periphery surface thereof, at which the outer-side concave groove corresponds to the inner-side concave groove;
a plurality of balls arranged in series axially between the inner-side concave groove and the outer-side concave groove;
an inside guide plate sandwiched between a rolling surface of each ball and an outer surface of the inner-side concave groove;
an outside guide plate sandwiched between the rolling surface of each ball and an inner surface of the outer-side concave groove,
the inner shaft and the outer shaft being combined so that a rotational force can be transmitted therebetween and axial relative displacement can be made,
wherein the rolling surface of each ball and a radially outside surface of the inside guide plate are in contact with each other only at two circumferentially set-apart inside contact parts, and portions of a radially inside surface of the inside guide plate, which correspond to the respective inside contact parts, are supported by the outer surface of the inner-side concave groove, wherein the rolling surface of each ball and a radially inside surface of the outside guide plate are in contact with each other only at two circumferentially set-apart outside contact parts, and portions of a radially outside surface of the outside guide plate, which correspond to the respective outside contact parts, are supported by the inner surface of the outer-side concave groove, wherein at a state after the extensible rotation transmission shaft is assembled, at least the inner surface of the outer-side concave groove is elastically deformed more radially outwards than a state before the assembling, thereby preloading the respective balls, and wherein the respective balls are preloaded, without elastic forces of the inside guide plate and the outside guide plate.

2. The extensible rotation transmission shaft according to claim 1,
wherein a first inside non-contact part of which a radially outside surface is not contacted to the rolling surfaces of the respective balls and a radially inside surface is not contacted to the outer surface of the inner-side concave groove is provided between the two inside contact parts of the inside guide plate.

3. The extensible rotation transmission shaft according to claim 1,
wherein a pair of second inside non-contact parts of which radially outside surfaces are not contacted to the rolling surfaces of the respective balls and radially inside surfaces are not contacted to the outer surface of the inner-side concave groove is provided at both circumferential portions of the two inside contact parts of the inside guide plate.

4. The extensible rotation transmission shaft according to claim 1,
wherein the inside guide plate is formed to have a cylindrical shape or a partially cylindrical shape, and is fitted to the outer periphery surface of the inner shaft with an interference.

5. The extensible rotation transmission shaft according to claim 1,
wherein a first outside non-contact part of which a radially inside surface is not contacted to the rolling surfaces of the respective balls and a radially outside surface is not contacted to the inner surface of the outer-side concave groove is provided between the two outside contact parts of the outside guide plate.

6. The extensible rotation transmission shaft according to claim 1,
wherein a pair of second outside non-contact parts of which radially inside surfaces are not contacted to the rolling surfaces of the respective balls and radially outside surfaces are not contacted to the inner surface of the outer-side concave groove is provided at both circumferential portions of the two outside contact parts of the outside guide plate.

7. The extensible rotation transmission shaft according to claim 1,
wherein the outside guide plate is formed to have a cylindrical shape or a partially cylindrical shape, and is fitted to the inner periphery surface of the outer shaft with an interference.

8. The extensible rotation transmission shaft according to claim 1,
wherein at least one guide plate of the inside guide plate and the outside guide plate is provided in plural, and each of the guide plates is formed to have a partially cylindrical shape.

9. The extensible rotation transmission shaft according to claim 1,
wherein the inner-side concave groove is provided at two positions on the outer periphery surface of the inner shaft at which the inner-side concave grooves are shifted in circumferential phase 180° relative to each other,
wherein the outer-side concave groove is provided at two positions on the inner periphery surface of the outer shaft at which the outer-side concave grooves correspond to the two inner-side concave grooves,
wherein the plurality of balls is arranged in two lines between the two inner-side concave grooves and the two outer-side concave grooves, and
wherein the outer periphery surface of the inner shaft is provided with two inner-side preliminary concave grooves recessed radially inwards and extended axially at positions at which the two inner-side preliminary concave grooves are shifted in circumferential phase 90° with respect to the two inner-side concave grooves.

10. The extensible rotation transmission shaft according to claim 1,
wherein the inner-side concave groove is provided at two positions on the outer periphery surface of the inner shaft at which the inner-side concave grooves are shifted in circumferential phase 180° relative to each other,
wherein the outer-side concave groove is provided at two positions on the inner periphery surface of the outer shaft at which the outer-side concave grooves correspond to the two inner-side concave grooves,
wherein the plurality of balls is arranged in two lines between the two inner-side concave grooves and the two outer-side concave grooves, and
wherein the inner shaft has a hollow cylinder shape.

11. The extensible rotation transmission shaft according to claim 1,
wherein the inner-side concave groove is provided at two positions on the outer periphery surface of the inner shaft at which the inner-side concave grooves are shifted in circumferential phase 180° relative to each other,
wherein the outer-side concave groove is provided at two positions on the inner periphery surface of the outer shaft at which the outer-side concave grooves correspond to the two inner-side concave grooves,
wherein the plurality of balls is arranged in two lines between the two inner-side concave grooves and the two outer-side concave grooves, and
wherein the inner periphery surface of the outer shaft is provided with two outer-side preliminary concave grooves recessed radially outwards and extended axially at positions at which the two outer-side preliminary concave grooves are shifted in circumferential phase 90° with respect to the two outer-side concave grooves.

12. An extensible rotation transmission shaft comprising:
an inner shaft having an inner-side concave groove recessed radially inwards and extended axially provided at least one circumferential location of an outer periphery surface thereof;
an outer shaft having a hollow cylinder shape into which the inner shaft can be inserted and having an outer-side concave groove recessed radially outwards and extended axially provided at least one circumferential location of an inner periphery surface thereof, at which the outer-side concave groove corresponds to the inner-side concave groove;

a plurality of balls arranged in series axially between the inner-side concave groove and the outer-side concave groove;

an inside guide plate sandwiched between a rolling surface of each ball and an outer surface of the inner-side concave groove;

an outside guide plate sandwiched between the rolling surface of each ball and an inner surface of the outer-side concave groove, the inner shaft and the outer shaft being combined so that a rotational force can be transmitted therebetween and axial relative displacement can be made, wherein the rolling surface of each ball and a radially outside surface of the inside guide plate are in contact with each other only at two circumferentially set-apart inside contact parts, and portions of a radially inside surface of the inside guide plate, which correspond to the respective inside contact parts, are supported by the outer surface of the inner-side concave groove, wherein the rolling surface of each ball and a radially inside surface of the outside guide plate are in contact with each other only at two circumferentially set-apart outside contact parts, and portions of a radially outside surface of the outside guide plate, which correspond to the respective outside contact parts, are supported by the inner surface of the outer-side concave groove, wherein at a state after the extensible rotation transmission shaft is assembled, at least the outer surface of the inner-side concave groove is elastically deformed more radially inwards than a state before the assembling, thereby preloading the respective balls, and wherein the respective balls are preloaded, without elastic forces of the inside guide plate and the outside guide plate.

* * * * *